US010151835B2

(12) United States Patent
Ito et al.

(10) Patent No.: US 10,151,835 B2
(45) Date of Patent: Dec. 11, 2018

(54) DISTANCE MEASUREMENT SYSTEM AND SOLID-STATE IMAGING SENSOR USED THEREFOR

(71) Applicant: Panasonic Intellectual Property Management Co., Ltd., Osaka (JP)

(72) Inventors: Junji Ito, Osaka (JP); Tohru Yamada, Kyoto (JP); Toshiya Fujii, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 444 days.

(21) Appl. No.: 15/045,851

(22) Filed: Feb. 17, 2016

(65) Prior Publication Data

US 2016/0161611 A1    Jun. 9, 2016

Related U.S. Application Data

(63) Continuation of application No. PCT/JP2014/004146, filed on Aug. 8, 2014.

(30) Foreign Application Priority Data

Aug. 23, 2013  (JP) .................................. 2013-173529

(51) Int. Cl.
*G01C 3/08* (2006.01)
*G01S 17/10* (2006.01)
(Continued)

(52) U.S. Cl.
CPC ............ *G01S 17/10* (2013.01); *G01S 7/4814* (2013.01); *G01S 17/003* (2013.01);
(Continued)

(58) Field of Classification Search
CPC ...... G01S 17/10; G01S 7/4814; G01S 17/003; G01S 17/023; G01S 17/87; G01S 17/89
See application file for complete search history.

(56) References Cited

U.S. PATENT DOCUMENTS 6,933,962 B2    8/2005  Yamamoto
8,174,683 B2    5/2012  Damink et al.
(Continued)

FOREIGN PATENT DOCUMENTS

CN    101356450    1/2009
JP    10-239029    9/1998
(Continued)

OTHER PUBLICATIONS

International Search Report dated Nov. 11, 2014 in corresponding International Application No. PCT/JP2014/004146.
(Continued)

*Primary Examiner* — Samantha K Abraham
(74) *Attorney, Agent, or Firm* — Wenderoth, Lind & Ponack, L.L.P.

(57) ABSTRACT

A distance measurement system includes: a signal generator which generates a light emission signal that instructs light emission and an exposure signal that instructs exposure of reflected light; a first illumination and distance measurement light source which receives the light emission signal and, according to the signal received, performs the light emission for illumination without a purpose of distance measurement and the light emission with the purpose of distance measurement using the reflected light; an imaging device which receives the exposure signal, performs the exposure according to the signal received, and obtains an amount of light exposure of the reflected light; and a calculator which calculates distance information using the amount of light exposure and outputs the distance information, wherein the distance measurement system has operation modes including an illumination mode and a first distance measurement mode.

18 Claims, 26 Drawing Sheets

(51) Int. Cl.
*G01S 17/89* (2006.01)
*G01S 7/481* (2006.01)
*G01S 17/00* (2006.01)
*G01S 17/02* (2006.01)
*G01S 17/87* (2006.01)

(52) U.S. Cl.
CPC ............ *G01S 17/023* (2013.01); *G01S 17/87* (2013.01); *G01S 17/89* (2013.01)

(56) References Cited

U.S. PATENT DOCUMENTS

| | | |
|---|---|---|
| 8,896,744 B2 | 11/2014 | Ogasahara et al. |
| 2002/0082474 A1 | 6/2002 | Yamamoto |
| 2003/0209893 A1* | 11/2003 | Breed ................ B60J 10/00 280/735 |
| 2006/0208169 A1* | 9/2006 | Breed ................ B60N 2/002 250/221 |
| 2007/0183066 A1* | 8/2007 | Varaprasad ............ B32B 17/06 359/844 |
| 2007/0228262 A1 | 10/2007 | Cantin et al. |
| 2008/0089557 A1 | 4/2008 | Iwaki et al. |
| 2010/0271617 A1 | 10/2010 | Damink et al. |
| 2011/0205521 A1 | 8/2011 | Mimeault et al. |
| 2012/0236190 A1 | 9/2012 | Ogasahara et al. |

FOREIGN PATENT DOCUMENTS

| | | |
|---|---|---|
| JP | 2000-83260 | 3/2000 |
| JP | 2002-191554 | 7/2002 |
| JP | 2002-274258 | 9/2002 |
| JP | 2004-279284 | 10/2004 |
| JP | 2005-170184 | 6/2005 |
| JP | 2006-318059 | 11/2006 |
| JP | 2010-535334 | 11/2010 |
| JP | 2012-209913 | 10/2012 |
| JP | 2013-120133 | 6/2013 |
| WO | 2009/016551 | 2/2009 |
| WO | 2012/122572 | 9/2012 |

OTHER PUBLICATIONS

Office Action dated Oct. 9, 2017 in corresponding Chinese Application No. 201480043384.3, with English translation of Search Report.

* cited by examiner

FIG. 13B

| | First distance measurement mode | Illumination mode |
|---|---|---|
| Pair A | Low beam | Low beam |
| Pair B | High beam | High beam |
| Pair C | Low beam | High beam |
| Pair D | High beam (infrared light) | Low beam |

FIG. 19

| R + IR | G + IR | R + IR | G + IR |
|--------|--------|--------|--------|
| IR     | B + IR | IR     | B + IR |
| R + IR | G + IR | R + IR | G + IR |
| IR     | B + IR | IR     | B + IR |

DISTANCE MEASUREMENT SYSTEM AND SOLID-STATE IMAGING SENSOR USED THEREFOR

CROSS REFERENCE TO RELATED APPLICATION

This is a continuation application of PCT International Application No. PCT/JP2014/004146 filed on Aug. 8, 2014, designating the United States of America, which is based on and claims priority of Japanese Patent Application No. 2013-173529 filed on Aug. 23, 2013. The entire disclosures of the above-identified applications, including the specifications, drawings and claims are incorporated herein by reference in their entirety.

FIELD

The present disclosure relates to a distance measurement system and a solid-state imaging sensor used therefor.

BACKGROUND

FIG. 21 illustrates a conventional detection system disclosed in Patent Literature 1, among various detection systems proposed in the past.

This detection system is intended for an automobile and includes: a light-emitting diode (LED) lamp 12 provided at the front part of the automobile as an infrared light source; a camera 13 as an imaging unit; a control circuit 14 provided inside the automobile as a control unit; and a monitor 15 as a display unit.

The LED lamp 12 is a light source different from a headlight light source provided for lighting up a dark place. The LED lamp 12 is provided in the vicinity of an edge of an automobile's bumper and emits near-infrared light having a wavelength of 880 nm, for example.

To implement an active system, the camera 13 includes a solid-state imaging sensor sensitive to the near-infrared light emitted by the LED lamp 12, and captures images using the near-infrared light.

As the monitor 15, a specialized monitor provided in the automobile's interior is used, or a monitor for a car navigation system, for example, is used, and the screen of the monitor shows the captured images mentioned above. Or, the monitor 15 is provided as a head-up display that shows the captured images on a screen provided on the inner surface of the windshield.

To implement a passive system, infrared receiving devices 16 detect infrared light emitted from pedestrians, animals, etc.

CITATION LIST

Patent Literature

Patent Literature 1: Japanese Unexamined Patent Application Publication No. 2002-274258

SUMMARY

Technical Problem

The conventional technique disclosed in Patent Literature 1, however, requires a light source for lighting up a dark place and another light source (the LED lamp 12) for oscillating near-infrared light to enable the camera 13 to capture images, and thus it is difficult to reduce the size and weight of the system (apparatus).

Also, in recent years, the detection system has been required to accurately obtain distance information in particular, in order to increase its performance and application.

In view of the above problems, the present disclosure provides a distance measurement system and a signal generation apparatus that enable reduction in size and weight of the system (apparatus) and enable distance measurement at high precision.

Solution to Problem

To solve the above problems, a distance measurement system according to an aspect of the present disclosure includes: a signal generator that generates a light emission signal that instructs light emission and an exposure signal that instructs exposure of reflected light; a first illumination and distance measurement light source that receives the light emission signal and, according to the light emission signal received, performs the light emission for illumination without a purpose of distance measurement and the light emission with the purpose of distance measurement using the reflected light; an imaging device that receives the exposure signal, performs the exposure according to the exposure signal received, and obtains an amount of light exposure of the reflected light; and a calculator that calculates distance information using the amount of light exposure and outputs the distance information, wherein the distance measurement system has operation modes including: an illumination mode in which the first illumination and distance measurement light source performs the illumination; and a first distance measurement mode in which the first illumination and distance measurement light source performs the light emission and the imaging device operates, to perform first distance measurement.

With this structure, a single light source (illumination and distance measurement light source) is used not only for illumination but also for distance measurement. It is thus possible to facilitate reduction in size and weight of the distance measurement system as compared to the structure in which an illumination system and a distance measurement system are provided independently of each other. It is also possible to enhance the precision of the distance measurement because the illumination and distance measurement light source is a light source used also for illumination and thus a sufficient amount of reflected light can be obtained for the distance measurement.

With the distance measurement system according to an aspect of the present disclosure, light emitted by the first illumination and distance measurement light source in the first distance measurement mode may have an amplitude larger than an amplitude of light emitted by the first illumination and distance measurement light source in the illumination mode.

This structure further enhances the precision of the distance measurement.

With the distance measurement system according to an aspect of the present disclosure, a time duration in which the light emitted by the first illumination and distance measurement light source in the first distance measurement mode is ON may be shorter than a time duration in which the light emitted by the first illumination and distance measurement light source in the illumination mode is ON.

This structure further enhances the precision of the distance measurement.

The distance measurement system according to an aspect of the present disclosure may further have a mode in which the imaging device operates and the calculator measures an amount of background light with the first illumination and distance measurement light source turned off, and the calculator may perform correction by subtracting the amount of background light from the amount of light exposure in the first distance measurement mode.

This structure enhances the precision of the distance measurement even further.

With the distance measurement system according to an aspect of the present disclosure, the first illumination and distance measurement light source may include a light-emitting diode (LED) of a single color or LEDs of a plurality of colors.

With the distance measurement system according to an aspect of the present disclosure, the first distance measurement mode and the illumination mode may be switched at least 120 times per second.

The distance measurement system according to an aspect of the present disclosure may further include a second illumination and distance measurement light source, and the calculator may further perform the distance measurement using phase difference information indicating a phase difference between the first illumination and distance measurement light source and the second illumination and distance measurement light source.

With the distance measurement system according to an aspect of the present disclosure, one of the first illumination and distance measurement light source and the second illumination and distance measurement light source may be either one of (a) left and right high beam light sources and (b) left and right low beam light sources, and the other of the first illumination and distance measurement light source and the second illumination and distance measurement light source may be the other one of (a) and (b). Here, the left and right high beam light sources and the left and right low beam light sources may be provided in a vehicle.

With the distance measurement system according to an aspect of the present disclosure, the calculator may perform second distance measurement by comparing a current frame and a previous frame using an image signal from the imaging device.

With the distance measurement system according to an aspect of the present disclosure, the calculator may correct one of distance information obtained from the first distance measurement and distance information obtained from the second distance measurement, using the other of the distance information obtained from the first distance measurement and the distance information obtained from the second distance measurement.

With the distance measurement system according to an aspect of the present disclosure, either the first distance measurement or the second distance measurement may be selected depending on: whether it is daytime or nighttime; the weather; the distance to the subject; the movement velocity of the subject; or the movement velocity of the distance measurement system.

With the distance measurement system according to an aspect of the present disclosure, the imaging device may include a solid-state imaging sensor, and the solid-state imaging sensor may be a charge-coupled device (CCD) solid-state imaging sensor.

With the distance measurement system according to an aspect of the present disclosure, the imaging device may include a solid-state imaging sensor including a plurality of pixels, and each of the plurality of pixels may include a light receiver that performs photoelectric conversion and an accumulator that accumulates signal charge read from the light receiver. The solid-state imaging sensor may be a metal-oxide-semiconductor (MOS) solid-state imaging sensor that collectively reads the signal charge of the light receiver from the plurality of pixels into the accumulator.

With the distance measurement system according to an aspect of the present disclosure, the imaging device may include a solid-state imaging sensor including a plurality of pixels, and each of the plurality of pixels may include a microlens having a structure in which materials having different refractive indices are concentrically and consecutively disposed with an axis perpendicular to a light-receiving surface as the central axis.

With the distance measurement system according to an aspect of the present disclosure, the imaging device may include a solid-state imaging sensor including a plurality of pixels, and each of the plurality of pixels may include any one of an infrared transmission filter, a first filter that transmits red light and infrared light, a second filter that transmits green light and infrared light, and a third filter that transmits blue light and infrared light.

With the distance measurement system according to an aspect of the present disclosure, at least one of the infrared transmission filter, the first filter, the second filter, and the third filter may be a filter formed by stacking inorganic materials.

The distance measurement system according to an aspect of the present disclosure may be installed in heavy equipment or each of heavy equipment and a structure at a worksite.

The distance measurement system according to an aspect of the present disclosure may be installed in transport equipment.

The distance measurement system according to an aspect of the present disclosure may be installed in housing equipment.

A signal generation apparatus according to an aspect of the present disclosure is a signal generation apparatus that controls a light emission pulse signal. The signal generation apparatus controls the light emission pulse signal which includes light emission pulse signals of a plurality of types. The light emission pulse signals of the plurality of types include: a first light emission pulse signal that instructs light emission with a purpose of distance measurement; and a second light emission pulse signal that instructs light emission for illumination without the purpose of distance measurement. The first light emission pulse signal is ON when the second light emission pulse signal is OFF.

This structure can enhance the precision of the distance measurement.

With the signal generation apparatus according to an aspect of the present disclosure, a time duration in which the first light-emission pulse signal is ON may be shorter than a time duration in which the second light-emission pulse signal is ON.

This structure can further enhance the precision of the distance measurement.

With the signal generation apparatus according to an aspect of the present disclosure, the second light-emission pulse signal may be turned ON after the time duration in which the first light-emission pulse signal is ON is repeated a plurality of times.

With the signal generation apparatus according to an aspect of the present disclosure, a sum of the number of times the first light-emission pulse signal is ON and the number of times the second light-emission pulse signal is ON may be at least 120 times per second.

With the signal generation apparatus according to an aspect of the present disclosure, the first light-emission pulse signal may have an amplitude larger than an amplitude of the second light-emission pulse signal.

With the signal generation apparatus according to an aspect of the present disclosure, the first light-emission pulse signal may be used for distance measurement performed based on time of flight (TOF).

The signal generation apparatus according to an aspect of the present disclosure may control an exposure signal that instructs exposure of light reflected by a subject, the light reflected by the subject being light emitted according to the first light-emission pulse signal.

Advantageous Effects

The distance measurement system and the signal generation apparatus according to the present disclosure enable reduction in size and weight of the system (apparatus) and enable distance measurement at high precision.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 13B illustrates exemplary pairs of high beam light sources and low beam light sources in a TOF mode (first distance measurement mode) and an illumination mode of a distance measurement system according to Embodiment 2.

FIG. 19 is a planar structure diagram of a solid-state imaging sensor according to an embodiment.

DESCRIPTION OF EMBODIMENTS

Hereinafter, a distance measurement system according to embodiments of the present disclosure will be described with reference to the drawings. Note that each of the embodiments described below is a specific example of the present disclosure. The numerical values, shapes, materials, structural elements, the arrangement and connection of the structural elements etc., shown in the following embodiments are mere examples, and are therefore not intended to limit the present disclosure.

Embodiment 1

A distance measurement system (sensing system) according to Embodiment 1 includes: a signal generator (signal generation apparatus) that generates (controls) light emission signals (light emission pulse signals) of a plurality of types that instruct light emission and an exposure signal that instructs exposure of reflected light; a first illumination and distance measurement light source that receives the light emission signals and, according to the light emission signals received, performs the light emission for illumination without a purpose of distance measurement (sensing) and the light emission with the purpose of distance measurement (sensing) using the reflected light; an imaging device that receives the exposure signal, performs the exposure according to the exposure signal received, and obtains an amount of light exposure of the reflected light; and a calculator that calculates distance information using the amount of light exposure and outputs the distance information, wherein the distance measurement system has operation modes including: an illumination mode in which the first illumination and distance measurement light source performs the illumination without operations of the imaging device and the calculator; and a first distance measurement mode (sensing mode) in which the first illumination and distance measurement light source performs the light emission and the imaging device operates, to perform first distance measurement.

Figure 1:
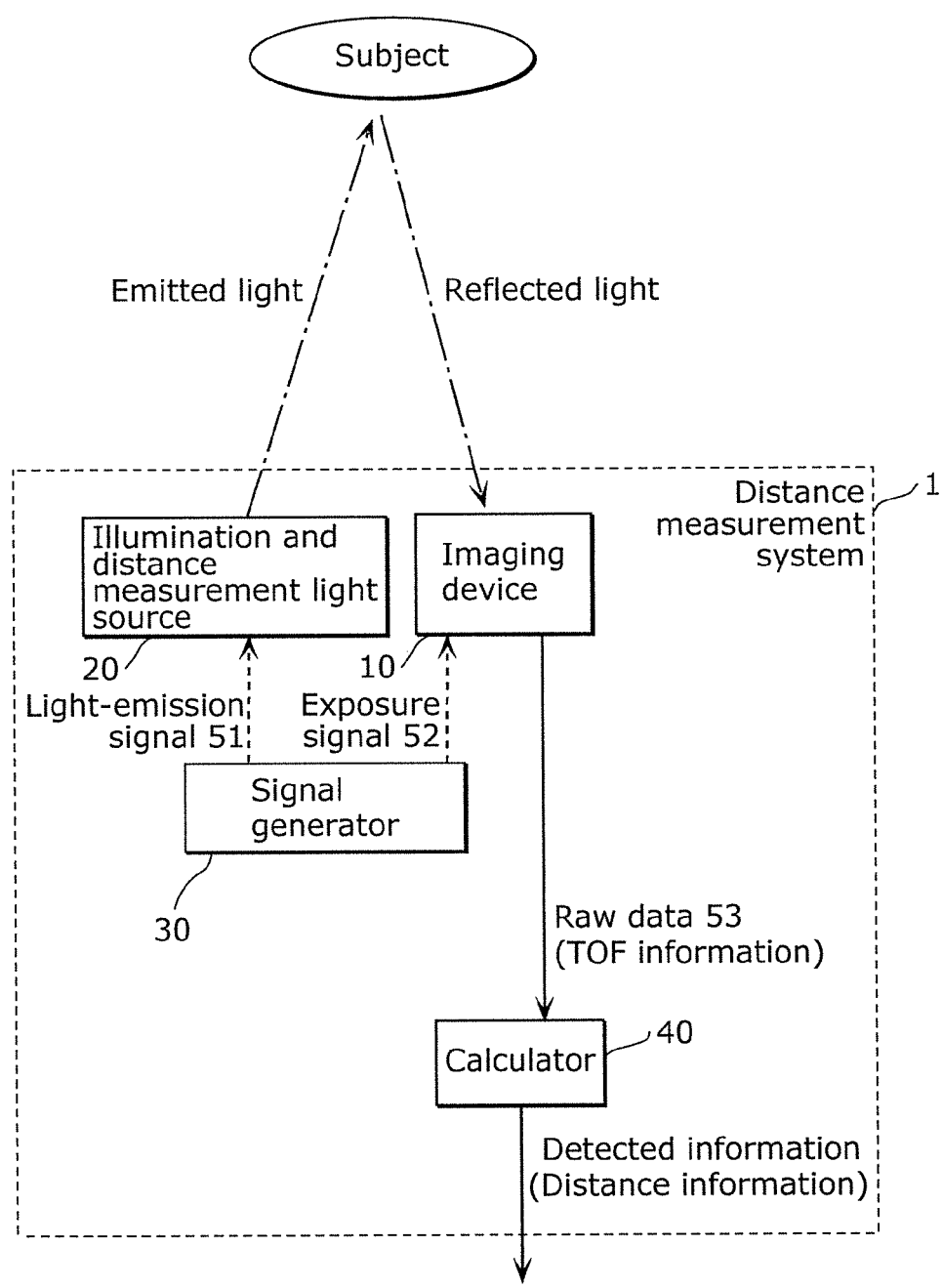
FIG. 1 is a functional block diagram illustrating a schematic structure of a distance measurement system according to Embodiment 1.

FIG. 1 is a functional block diagram illustrating a schematic structure of a distance measurement system according to Embodiment 1.

As illustrated in FIG. 1, a distance measurement system (sensing system) 1 includes an imaging device 10, an illumination and distance measurement light source 20 (a first illumination and distance measurement light source), a signal generator 30, and a calculator 40.

The illumination and distance measurement light source 20 includes a driving circuit, a capacitor, and a light-emitting device, and emits light by supplying the light-emitting device with charge held in the capacitor. As the light-emitting device, a laser diode, a light-emitting diode (LED), or the like may be used.

Figure 12:
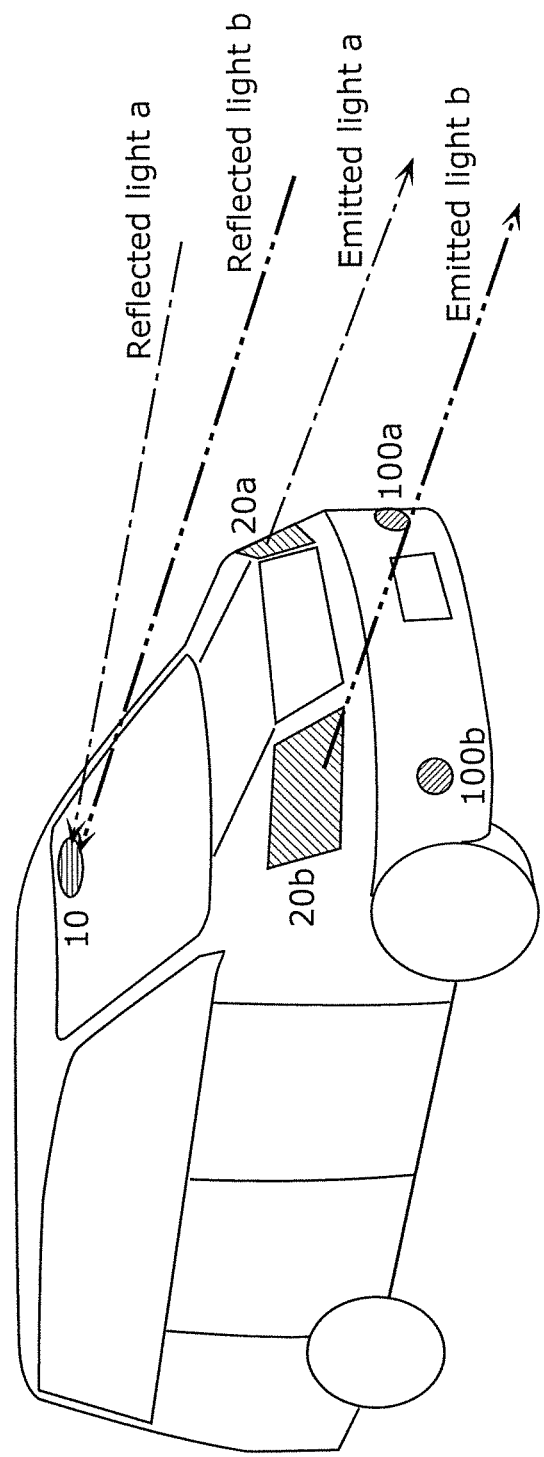
FIG. 12 is a schematic diagram illustrating an example where a distance measurement system according to Embodiment 2 is installed in an automobile.

The illumination and distance measurement light source 20 doubles as: an illumination light source used for lighting up a dark place without the purpose of distance measurement; and a distance measurement light source used for detecting a physical quantity such as a distance. For example, as illustrated in FIG. 12 which is described later, the illumination and distance measurement light source 20 doubles as a headlight (headlight assembly) or a fog lamp when used in transport equipment (e.g., automobile)

As the LED used for the illumination and distance measurement light source 20, a monochromatic LED (e.g., white LED) can be used.

Furthermore, as the LED used for the illumination and distance measurement light source 20, LEDs of a plurality of colors (e.g., red LED, blue LED, and yellow LED) may be combined. In this case, use of a long-wavelength light source (e.g., red LED) for distance measurement reduces attenuation caused by diffusing particles such as fog, thus enabling measurement of a longer distance than in the case of using a white LED.

As the LEDs of the plurality of colors, a white LED may be combined with a red LED, a blue LED, a yellow LED, and so on, for example. In this case, for example, when there is strong sunlight, e.g., in the later afternoon, a white LED with a shorter wavelength is used. When it is raining, a light source with a long wavelength (e.g., red LED) which can reduce attenuation caused by diffusion is used. At night, light from the light source closer to the sidewalk, rather than the light source closer to the oncoming lane, is made stronger to increase the distance the light travels, depending on the road condition. By using different LEDs for different purposes in such a manner, distance measurement can be performed at high precision regardless of the weather and the environmental situation.

Moreover, combining the LEDs of the plurality of colors such as a red LED, a blue LED, and a yellow LED enables distance measurement for which near-infrared light is selected from the wavelength range of light oscillated by the illumination light source.

The signal generator 30 generates a light-emission signal (a first light-emission pulse signal and a second light-emission pulse signal) 51 that instructs light emission and an exposure signal 52 that instructs exposure of light reflected by a subject. The illumination and distance measurement light source 20 emits light with the purpose of measuring a distance to a subject, according to the timing of receiving the light-emission signal (first light-emission pulse signal) 51 generated by the signal generator 30. The illumination and distance measurement light source 20 also emits light for lighting up a dark place without the purpose of distance measurement, according to the timing of receiving the light-emission signal (second light-emission pulse signal) 51 generated by the signal generator 30.

The imaging device 10 includes a camera lens, a solid-state imaging sensor (image sensor), and a circuit which generates and outputs raw data 53, such as an analog-to-digital (A/D) converter. Note that the present embodiment encompasses the case where the circuit which generates and outputs raw data 53, such as an A/D converter, is included in the solid-state imaging sensor.

The imaging device 10 exposes a region including a target object (subject) to light for a plurality of times at the timing indicated by the exposure signal 52 generated by the signal generator 30, and outputs the raw data 53 (time of flight (TOF) information) corresponding to the total amount of the light exposure performed for the plurality of times.

The calculator 40 performs an operation based on the raw data 53 received from the imaging device 10, and outputs distance information (detected information) indicating the distance to the subject.

Note that the present embodiment encompasses the case where a part or all of the signal generator 30, the imaging device 10, and the calculator 40 are incorporated into one chip on a semiconductor substrate.

Figure 2:
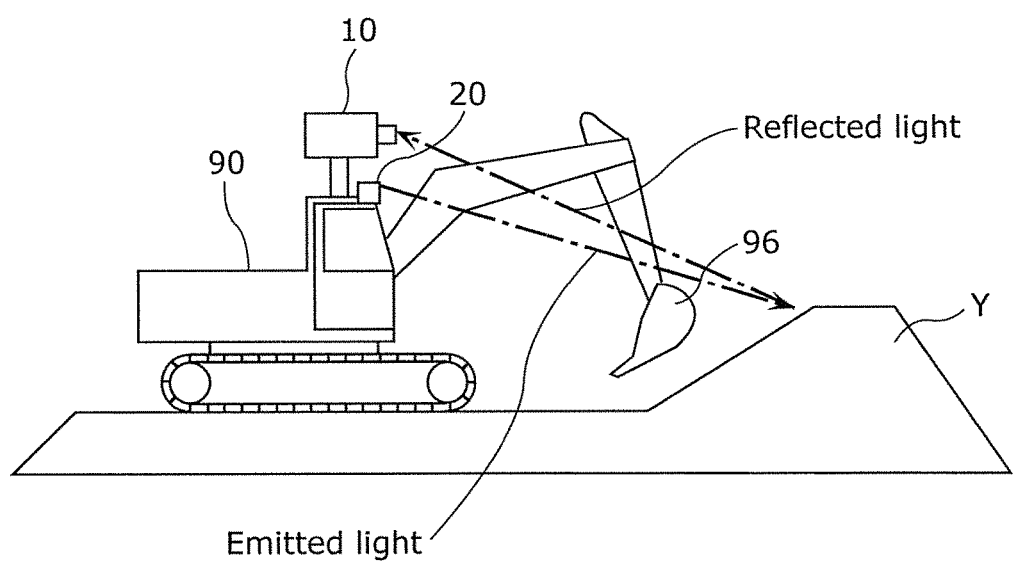
FIG. 2 is a schematic diagram illustrating an example of installation of a distance measurement system according to Embodiment 1.
Figure 3:
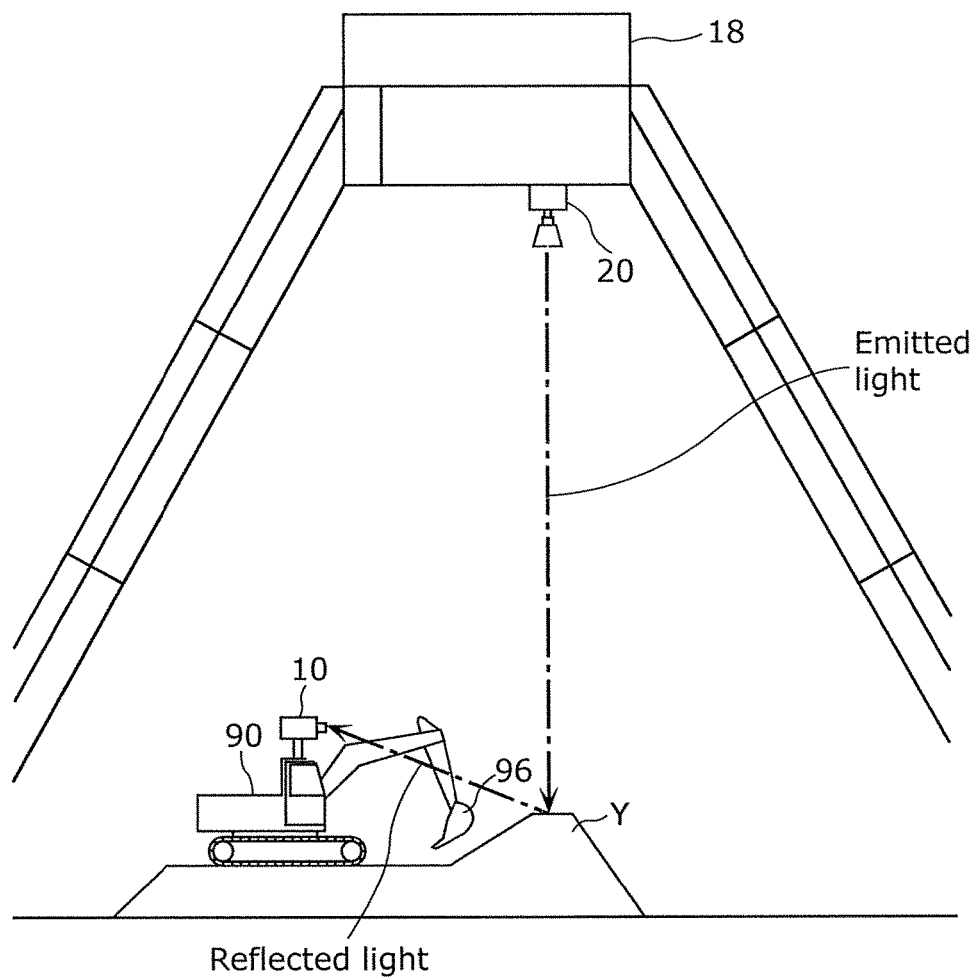
FIG. 3 is a schematic diagram illustrating an example of installation of a distance measurement system according to Embodiment 1.

FIG. 2 and FIG. 3 are schematic diagrams illustrating examples of installation of the distance measurement system in FIG. 1. FIG. 2 is a schematic diagram illustrating the case of installation of the distance measurement system in an excavator, which is heavy equipment. FIG. 2 illustrates the details of the illumination and distance measurement light source 20 and the imaging device 10 in particular.

In FIG. 2, an excavator 90 is provided with the illumination and distance measurement light source 20 and the imaging device 10, and the imaging device 10 is provided at the upper part of the upper rotary body of the excavator 90. The upper rotary body of the excavator 90 has a vehicle front part to which an arm is attached, and a bucket 96 is attached at the tip of the arm for scooping bulk materials. The upper rotary body is 360-degree rotatable.

In FIG. 3, the excavator 90 is provided with the imaging device 10, and the illumination and distance measurement light source 20 is provided at a structure 18 at the worksite.

The installation of the distance measurement system 1 according to the present embodiment in heavy equipment or each of heavy equipment and a structure at a worksite enables accurate measurement of a distance to an obstacle in the case of digging the ground, for example. More specifically, despite its small size and light weight, the distance measurement system 1 makes automated operations possible, such as automatically digging for a given distance or a distance to an obstacle (e.g., the distance to the point Y in FIG. 2 and FIG. 3), and automatically stopping the operation when a target distance is exceeded (or when the target distance is approached).

Note that although FIG. 2 and FIG. 3 illustrated the examples of installation of the distance measurement system 1 in heavy equipment, the present disclosure is not limited to these examples. It is also possible to install the distance measurement system 1 in a variety of equipment, such as other types of heavy equipment (e.g., bulldozer), transport equipment (e.g., automobile, bicycle, motorcycle, railroad car, airplane, spacecraft), infrastructure equipment, and housing equipment.

Figure 4:
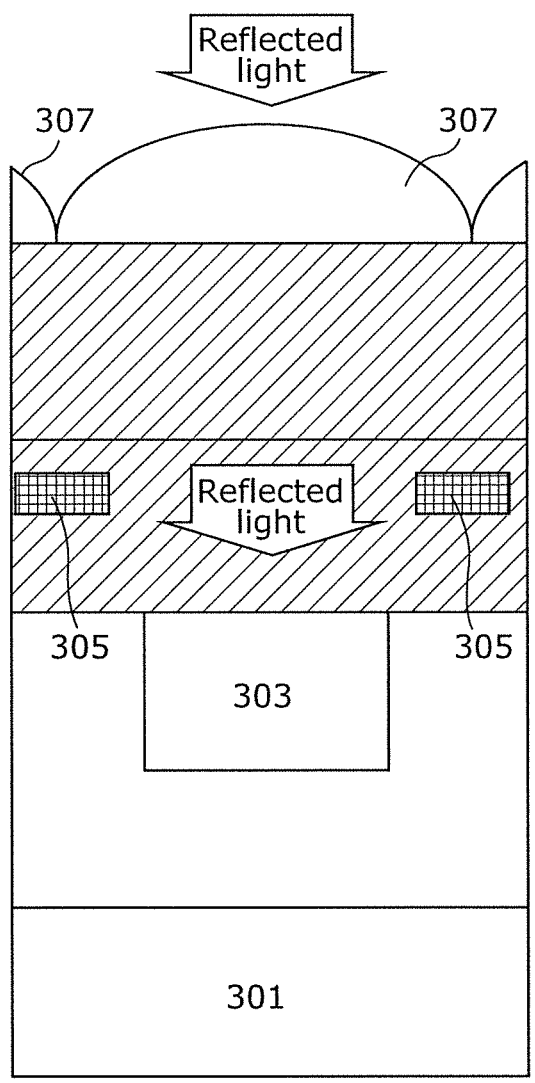
FIG. 4 is a cross-sectional view illustrating a structure of a pixel in a solid-state imaging sensor according to Embodiment 1.

FIG. 4 is a cross-sectional view illustrating the structure of a pixel in the solid-state imaging sensor according to the present embodiment.

The solid-state imaging sensor in FIG. 4 includes, for example, a semiconductor substrate 301, a light receiver (PD) 303, a metal wire, a gate electrode or transfer electrode 305, and a microlens 307. Light reflected by the subject is concentrated by the microlens 307 and reaches the light receiver (PD) 303.

Note that as the solid-state imaging sensor according to the present embodiment, it is possible to use an image sensor sensitive only to infrared light (hereinafter referred to as IR) and an image sensor sensitive to light in the red range, green range, and blue range (hereinafter referred to as RGB) and to IR (hereinafter referred to as RGB+IR). The case of using RGB+IR will be described in detail later.

Next, the case of using a charge-coupled device (CCD) solid-state imaging sensor for the imaging device 10 of the distance measurement system 1 according to the present embodiment will be described.

Figure 5:
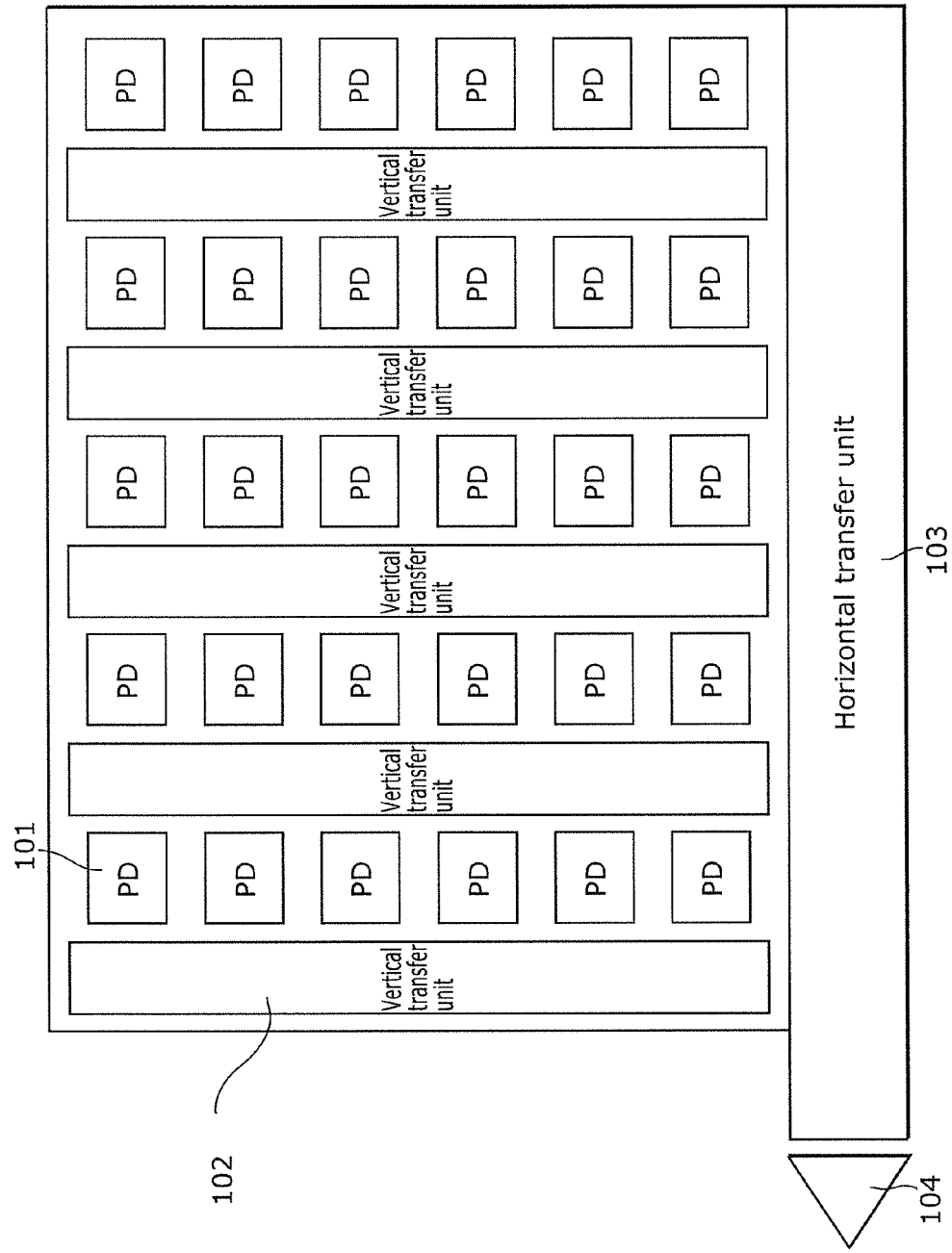
FIG. 5 is a functional structure diagram of a CCD solid-state imaging sensor according to Embodiment 1.

FIG. 5 is a functional structure diagram of the CCD solid-state imaging sensor. As illustrated in FIG. 5, the CCD solid-state imaging sensor includes light receivers (photodiodes (PDs)) 101, a plurality of vertical transfer units 102, a horizontal transfer unit 103, and a signal charge detection unit 104.

The photodiodes 101 convert received light into charge. Each of the vertical transfer units 102 includes a plurality of gates and vertically transfers in sequence the charge read from the photodiodes 101. The horizontal transfer unit 103 includes a plurality of gates, and horizontally transfers in sequence the charge received from the vertical transfer units 102 as packets. The signal charge detection unit 104 sequentially detects the charge received from the horizontal transfer unit, converts the charge into a voltage signal, and outputs raw data (TOF information) 53 in the form of the voltage signal obtained through the conversion.

With an operation of collectively resetting the plurality of photodiodes (PDs) 101 known as global reset, it is possible to eliminate the time difference in the light detected by each PD, thus enabling highly-precise distance measurement performed through the use of measurement of a delay of light traveling to the measurement target.

Note that although FIG. 5 illustrates a CCD image sensor (CCD solid-state imaging sensor), a metal-oxide-semiconductor (MOS) image sensor can also be used in the present embodiment. The MOS image sensor includes a solid-state imaging sensor having a plurality of pixels. Each of the plurality of pixels includes a light receiver which performs photoelectric conversion and an accumulator which accumulates signal charge read from the light receiver. The MOS image sensor has a feature of collectively reading the signal charge of the light receiver from the plurality of pixels into the accumulator.

Figure 6:
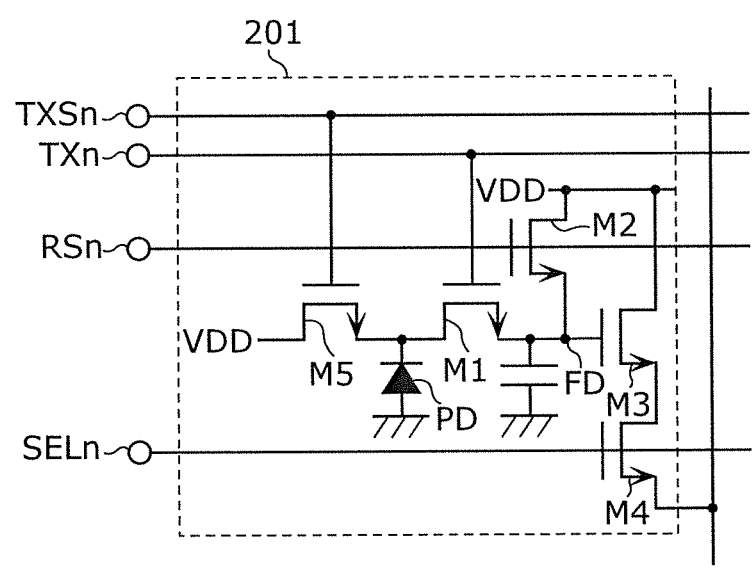
FIG. 6 is a circuit diagram illustrating a structure of a unit cell of a MOS solid-state imaging sensor according to Embodiment 1.

FIG. 6 illustrates an example of a MOS solid-state imaging sensor used for the imaging device 10 included in the distance measurement system 1 according to the present embodiment, and is a circuit diagram illustrating a structure of a unit cell 201 of a MOS image sensor. Here, it is assumed that n is an integer ranging from 1 to 4.

As can be seen from FIG. 6, each unit cell 201 includes: a PD that is a light receiver; a shutter transistor M5 for resetting (discharging) signal charge accumulated in the PD, by setting a shutter signal TXSn to the high level; a floating diffusion (FD) that is an accumulator; a reading transistor M1 for reading the signal charge accumulated in the PD into the FD, by setting a transfer signal TXn to the high level; a reset transistor M2 for resetting the signal charge read into the FD, by setting a reset signal RSn to the high level; a source follower transistor M3 having a gate connected or coupled to the FD; and a line selection transistor M4 that connects or couples the source follower transistor M3 to a vertical signal line by setting a selection signal SELn to the high level. The drain of each of the reset transistor M2, the source follower transistor M3, and the shutter transistor M5 is connected or coupled to a pixel electrode VDD.

Figure 7:
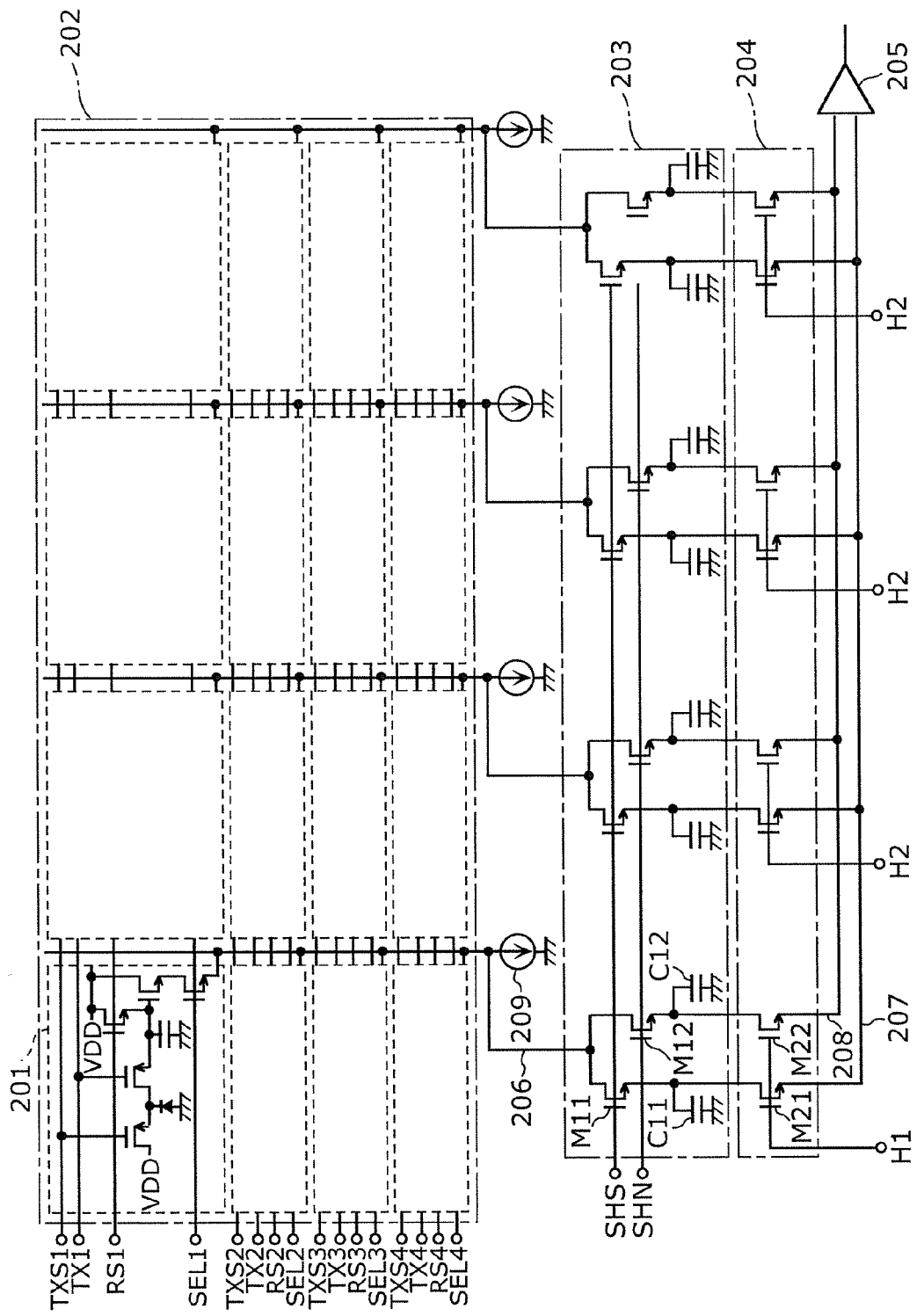
FIG. 7 is a schematic structure diagram of a MOS image sensor having a two-dimensional array of unit cells according to Embodiment 1.

FIG. 7 is a schematic structure diagram of a MOS image sensor having a two-dimensional array of unit cells 201 each having the structure illustrated in FIG. 6.

The MOS image sensor in FIG. 7 includes: an imaging area 202 which is a two-dimensional array of the unit cells 201 in four rows and four columns; an FPN removal unit 203 that removes fixed pattern noise (FPN) caused by variation in transistor threshold voltages among the columns; a horizontal selection unit 204 that sequentially selects output signals of the FPN removal unit 203; and a differential amplifier 205 that amplifies output signals of the horizontal selection unit 204. Note that the size of the imaging area 202 is as small as four rows and four columns for the purpose of illustration.

The rows of the imaging area 202 are sequentially selected by a vertical scan unit that is not illustrated. Each column has a vertical signal line 206 to which a current source 209 is connected or coupled. Each column of the FPN removal unit 203 includes: a signal-level sampling transistor M11 that receives a sample and hold signal SHS; a reset-level sampling transistor M12 that receives a sample and hold signal SHN; a signal-level capacitor C11; and a reset-level capacitor C12. Each column of the horizontal selection unit 204 includes: a first column selection transistor M21 interposed between the signal-level capacitor C11 and a first horizontal signal line 207; and a second column selection transistor M22 interposed between the reset-level capacitor C12 and a second horizontal signal line 208. The columns of the horizontal selection unit 204 are sequentially selected according to signals H1 to H4 from a horizontal scan unit that is not illustrated. The differential amplifier 205 amplifies the potential difference between the first horizontal signal line 207 and the second horizontal signal line 208.

The solid-state imaging sensor illustrated in FIG. 6 and FIG. 7 has a feature of including an accumulator (FD in FIG. 6) that collectively reads and accumulates the signal charge of the PDs from the all pixels. This solid-state imaging sensor can collectively reset a plurality of photodiodes PD in the imaging area 2. That is to say, the global shutter and global reset functions can be achieved even with the MOS solid-state imaging sensor.

The solid-state imaging sensor according to the present embodiment, however, is not limited to the CCD image sensor and the MOS image sensor illustrated in FIG. 5, FIG. 6, and FIG. 7. Even the use of other solid-state imaging sensors (image sensors) while taking into account other requirements for the distance measurement system 1 yields a later-described advantageous effect (e.g., enhancement in the precision of the distance measurement).

Figure 8:
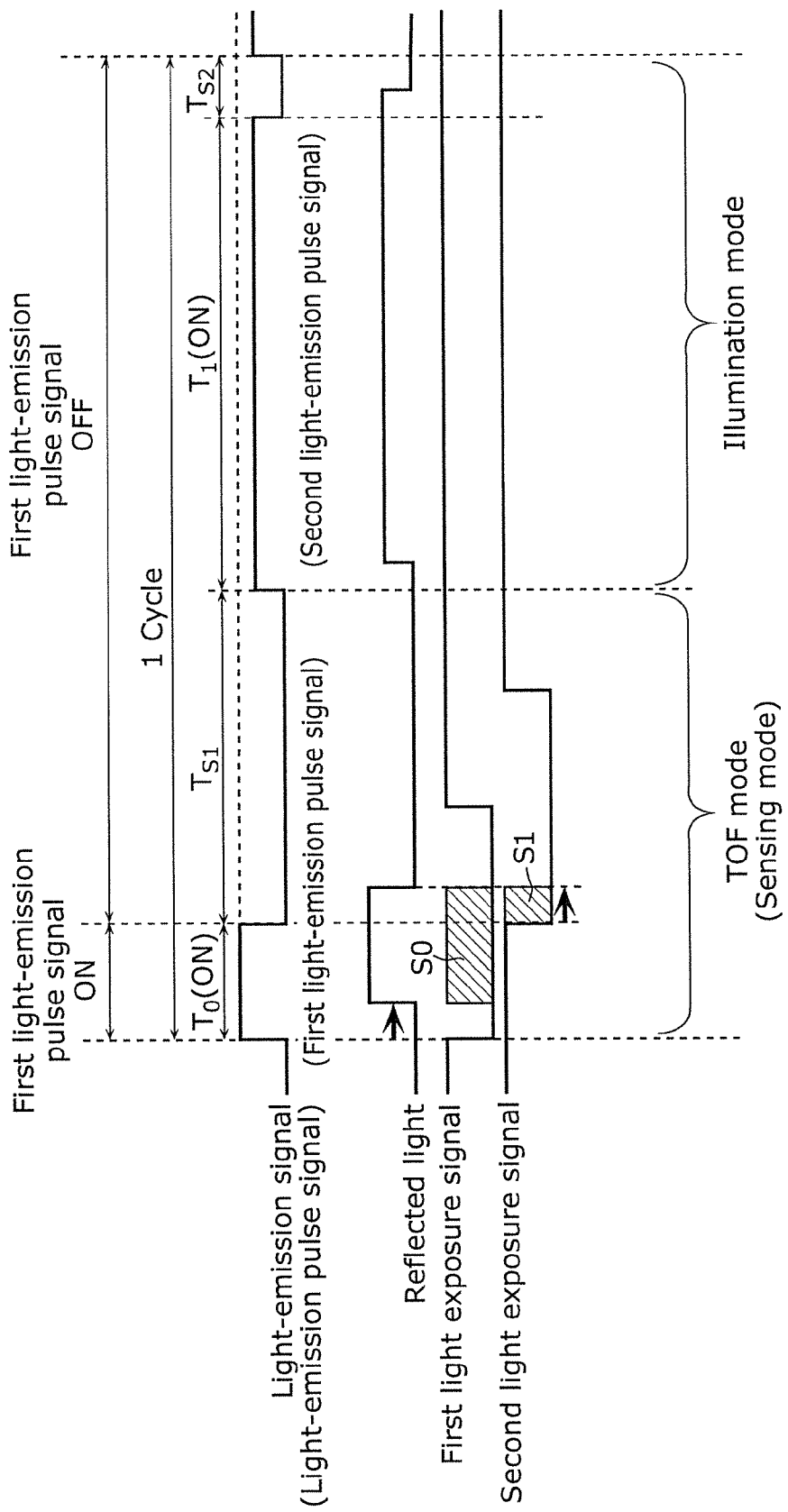
FIG. 8 is a first timing diagram illustrating an example of operation using a light-emission signal and an exposure signal according to Embodiment 1.
Figure 9A:
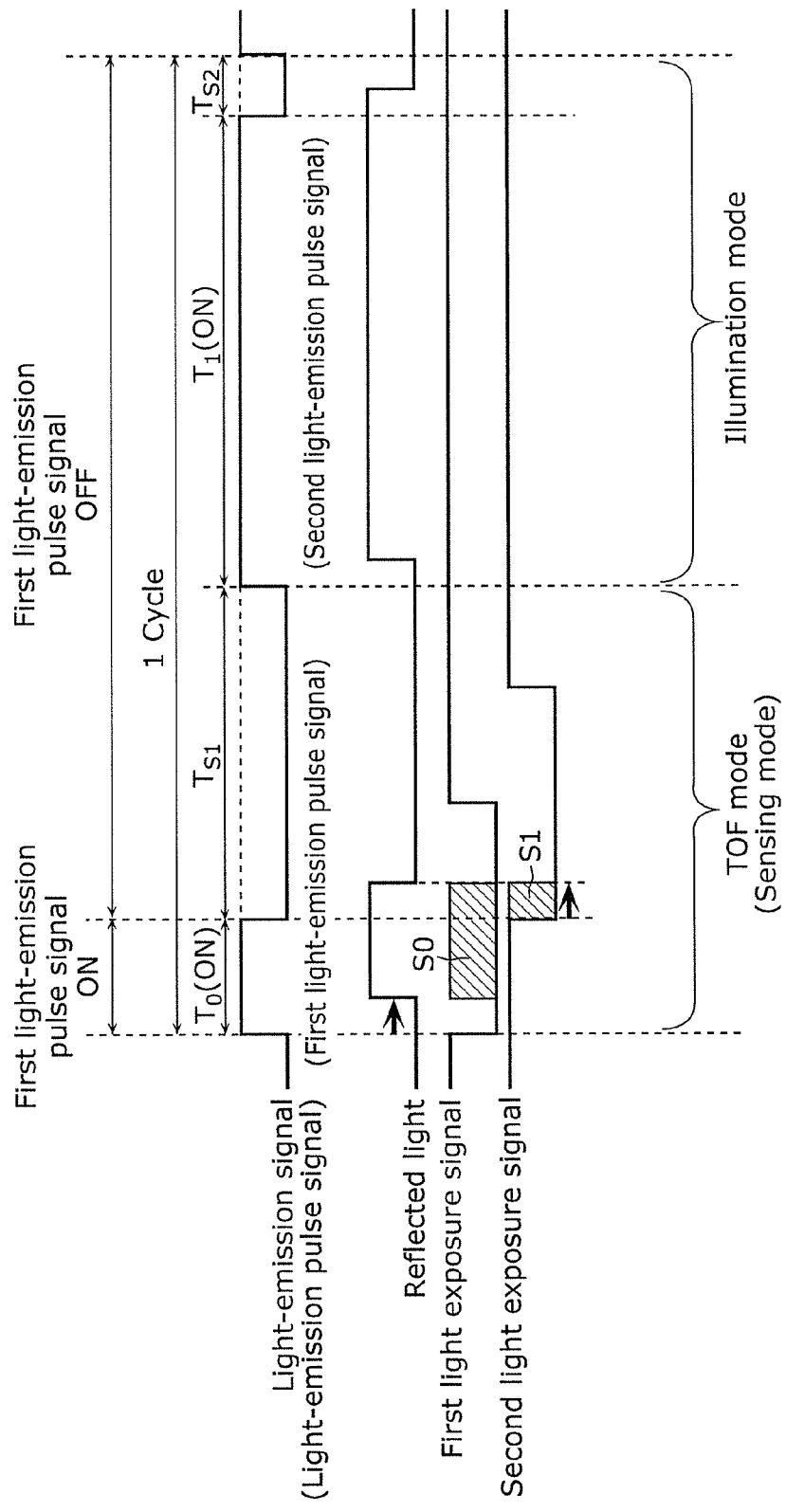
FIG. 9A is a second timing diagram illustrating an example of operation using a light-emission signal and an exposure signal according to Embodiment 1.
Figure 10:
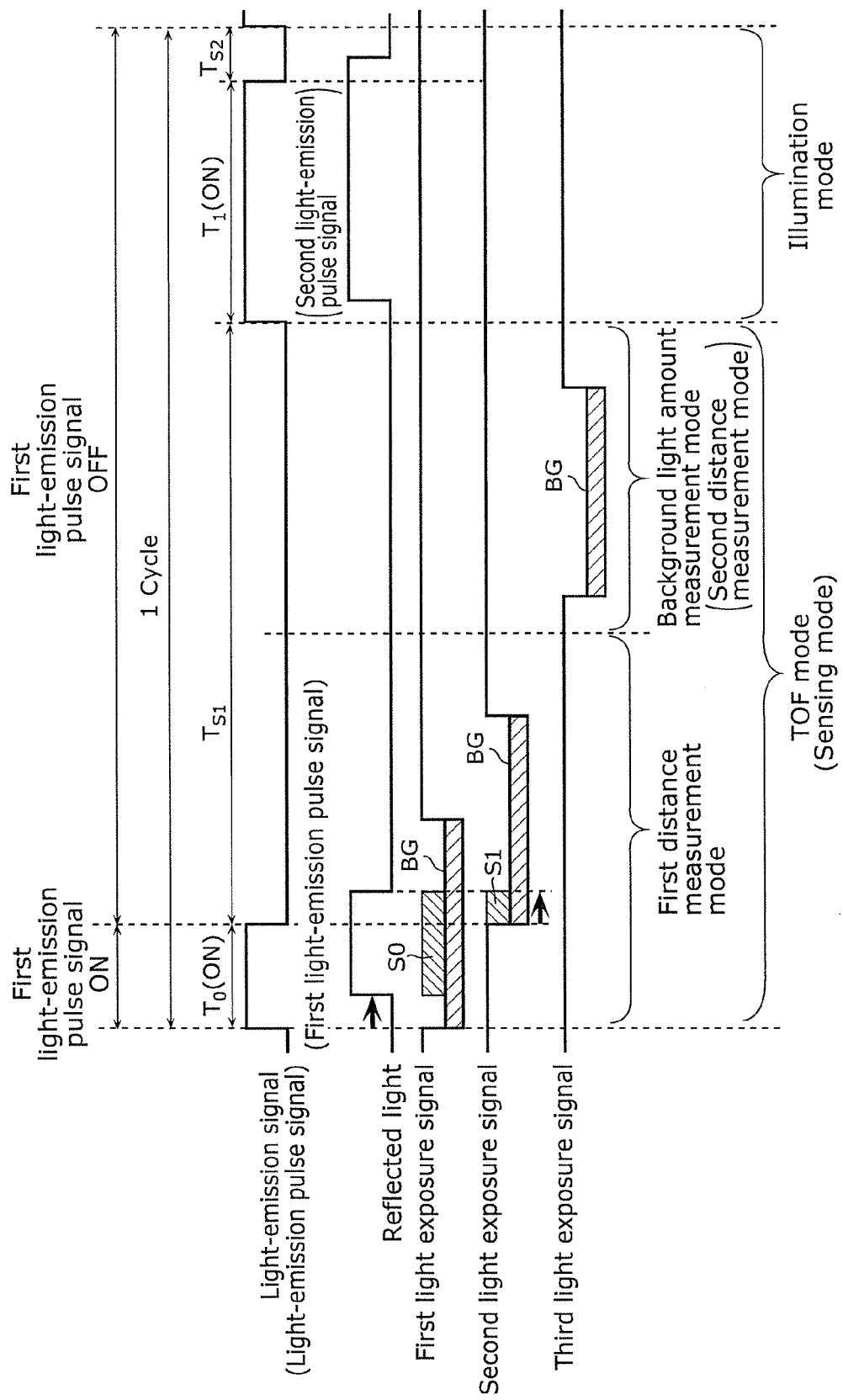
FIG. 10 is a third timing diagram illustrating an example of operation using a light-emission signal and an exposure signal according to Embodiment 1.

Next, a method for operating the distance measurement system according to the present embodiment will be described in detail with reference to timing diagrams in FIG. 8, FIG. 9A, and FIG. 10. FIG. 8, FIG. 9A, and FIG. 10 are first to third timing diagrams each illustrating an example of operation according to the light-emission signal and the exposure signal. The present embodiment can adopt the operation according to any one of the first to third timing diagrams.

First, the following describes, as a first driving method, a driving operation to be performed for distance measurement (TOF mode) with reference to FIG. 8. The light-emission signal 51 includes: a first light-emission pulse signal that instructs light emission with the purpose of distance measurement; and a second light-emission pulse signal that instructs light emission for illumination without the purpose of distance measurement. The first light-emission pulse signal is ON when the second light-emission pulse signal is OFF, and the first light-emission pulse signal is used for performing distance measurement based on the TOF. With the basic principle of the TOF where a distance is measured based on a time period required for projected light to travel to and from a target, a distance to a measurement target, that is, a subject, is calculated based on a ratio between an amount of light exposed according to the exposure signal 52 controlled with the timing of a first exposure signal and an amount of light exposed according to the exposure signal 52 controlled with the timing of a second exposure signal, which is different from the timing of the first exposure signal. Here, the exposure signal 52 is a signal that instructs exposure of the light emitted according to the light-emission signal (first light-emission pulse signal) 51 and reflected by the measurement target. For example, with the first exposure signal, light exposure is performed so as to include all the reflected light from the measurement target, whereas with the second exposure signal, light exposure is performed in such a manner that the amount of light exposure increases with an increase in delay of the reflected light from the measurement target with respect to the light-emission timing. To detect an offset component such as the background light, light exposure is performed on the same condition as the condition of the first exposure signal and the second exposure signal, with the light-emission signal 51 stopped.

Then, a distance L to the subject is calculated using the following values: a total sum S0 of the amount of light exposure according to the first exposure signal; a total sum S1 of the amount of light exposure according to the second exposure signal; a total sum BG of the amount of exposure of the background light; a time duration T0 in which the light-emission signal 51, which is a signal for emitting direct light, is ON; and light velocity c (see Equation 1).

[Math. 1]

$$L = \frac{c \cdot T_0}{2} \times \left( \frac{S1 - BG}{S0 - BG} \right) \quad \text{(Equation 1)}$$

The timings of the light-emission signal 51, the first exposure signal, and the second exposure signal for one image are as follows: The light-emission signal (first light-emission pulse signal) 51 and the first exposure signal are repeatedly output for a plurality of times, then the light-emission signal (first light-emission pulse signal) 51 and the second exposure signal are repeatedly output for the same number of times, and then the light-emission signal (first light-emission pulse signal) 51 is stopped and the exposure signal 52 indicating the same condition as the condition of the first exposure signal and the second exposure signal is repeatedly output for the same number of times. With this series of timings regarded as one set, a plurality of sets are repeated, and then the accumulated amount of light exposure is output to calculate the distance to the subject using Equation 1.

Now, the following describes a driving operation to be performed for illumination (illumination mode) with reference to FIG. 8. This operation is performed so that the light amplitude in the TOF mode (sensing mode) is larger than the light amplitude in the illumination mode. That is to say, the first light-emission pulse signal has an amplitude larger than the amplitude of the second light-emission pulse signal, so that the light emitted by the illumination and distance measurement light source 20 in the TOF mode has an amplitude larger than the amplitude of the light emitted by the illumination and distance measurement light source 20 in the illumination mode.

This enables the distance measurement system 1 according to the present embodiment to achieve reduction in size and weight and to accurately obtain the distance information by having a light source that doubles as: a light source for lighting up a dark place; and a light source for distance measurement performed using reflected light.

Next, a second driving method will be described in detail with reference to FIG. 9A, centering on the differences from the description given with reference to FIG. 8.

First, the driving in the illumination mode is the same as in the driving method illustrated in FIG. 8. In contrast, in the TOF mode (sensing mode), although the same driving as that described with reference to FIG. 8 is performed, the time duration in which the series of operations is performed is shorter than in the illumination mode. That is to say, the time duration in which the light is ON is shorter in the TOF mode than in the illumination mode. In other words, the time duration in which the first light-emission pulse signal is ON is shorter than the time duration in which the second light-emission pulse signal is ON, and thus, the time duration in which the light emitted by the illumination and distance measurement light source 20 in the TOF mode is ON is shorter than the time duration in which the light emitted by the illumination and distance measurement light source 20 in the illumination mode is ON.

This operation enables, as in the case of FIG. 8, the distance measurement system 1 to achieve reduction in size and weight and to accurately obtain the distance information.

Next, a third driving method will be described in detail with reference to FIG. 10, centering on the differences from the description given with reference to FIG. 8.

In FIG. 10, the TOF mode (sensing mode) includes a first distance measurement mode and a background light amount measurement mode (second distance measurement mode). In this example, the distance measurement system 1 has a mode in which the imaging device 10 operates and the calculator 40 measures the amount of background light with the illumination and distance measurement light source 20 turned off, and the calculator 40 performs correction by subtracting the amount of background light from the amount of light exposure in the first distance measurement mode.

The basic operation in the first distance measurement mode is the same as that described with reference to FIG. 8 and FIG. 9A. In the background light amount measurement mode, a third light exposure signal is added as a timing pattern of the exposure signal 52. More specifically, it is the driving mode for measuring the amount of background light with the illumination and distance measurement light source 20 turned off (that is, when measuring the distance, the amount of background light is subtracted from the data obtained in the TOF mode).

This operation enables the distance measurement system 1 to achieve reduction in size and weight and to more accurately obtain the distance information.

We now continue with the description of the method for operating the distance measurement system. According to the driving method illustrated in FIG. 8, FIG. 9A, and FIG. 10, in order for the number of times the light is turned on for illumination plus the number of times the light is turned on for the TOF to be greater than a certain number of times, high-speed pulse driving is performed with a sum of the number of times the first light-emission pulse signal is ON and the number of times the second light-emission pulse signal is ON being t 60 times or greater per second, more preferably, 120 times or greater per second. For example, the number of times the light is turned on for illumination plus the number of times the light is turned on for the TOF is set to be 60 times or greater per second, more preferably, 120 times or greater per second. Put it differently, the first distance measurement mode and the illumination mode are switched at least 120 times per second.

This can prevent the subject, pedestrians, etc., from perceiving a flicker of light from the LED light source, and thus can protect their eyes. In other words, human eyes are protected from a flicker and visual discomfort because although the LED is in fact dynamically turned on at a speed of 120 times or greater per second by pulse driving, human eyes perceive the light as continuously-emitted light due to the afterimage effect.

This means that the present embodiment enables the distance measurement system 1 to protect the eyes of the subject, pedestrians, etc., as well as to achieve reduction in size and weight and to accurately obtain the distance information.

Note that the distance measurement system according to the present embodiment can also be driven using the driving methods of FIG. 8, FIG. 9A, and FIG. 10 in combination.

Figure 9B:
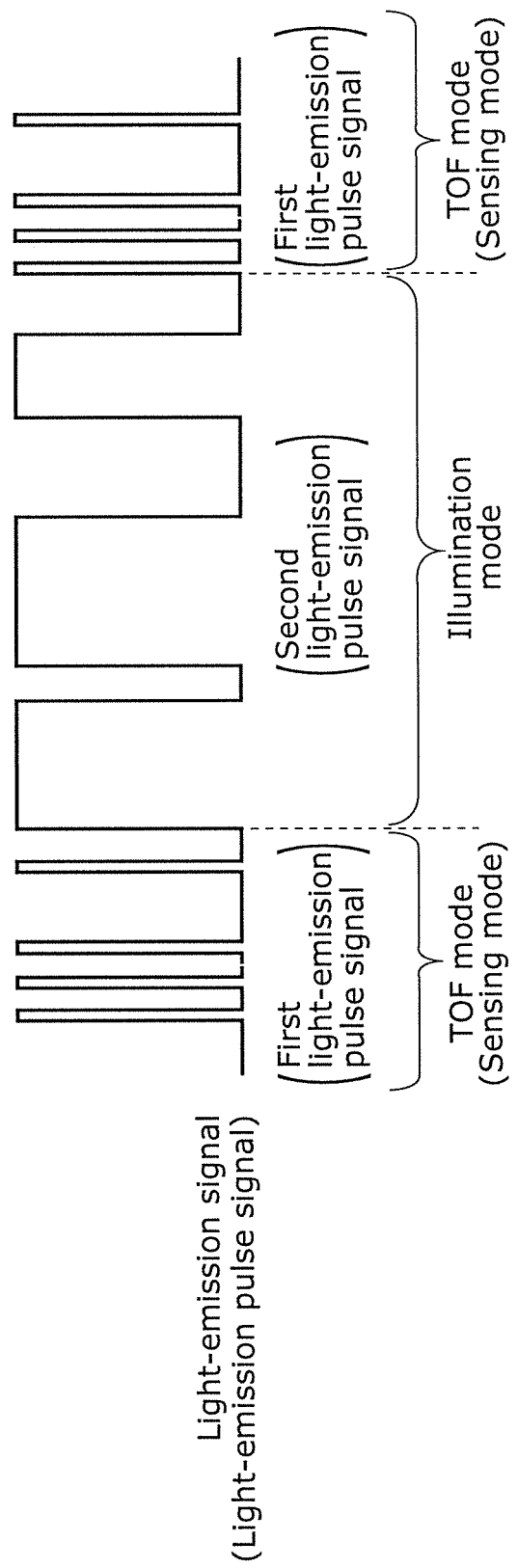
FIG. 9B illustrates an operation example in which a distance measurement system operates in a TOF mode or an illumination mode repeatedly for a certain number of times according to Embodiment 1.

With reference to the driving methods illustrated in FIG. 8, FIG. 9A, and FIG. 10, an example of driving the distance measurement system in the TOF mode and the illumination mode alternately has been described. The present disclosure, however, is not limited to this, and the second light-emission pulse signal may be turned ON after the time duration in which the first light-emission pulse signal is ON is repeated a plurality of times. FIG. 9B illustrates an operation example in which the distance measurement system operates in the TOF mode or the illumination mode repeatedly for a certain number of times. As illustrated in FIG. 9B, the distance measurement system can also operate in the TOF mode or the illumination mode repeatedly for a certain number of times, for example.

Embodiment 2

Hereinafter, the structure and operation of the distance measurement system 1 according to Embodiment 2 will be described in detail with reference to the drawings, centering on the differences from the description given in the above embodiment.

Figure 11:
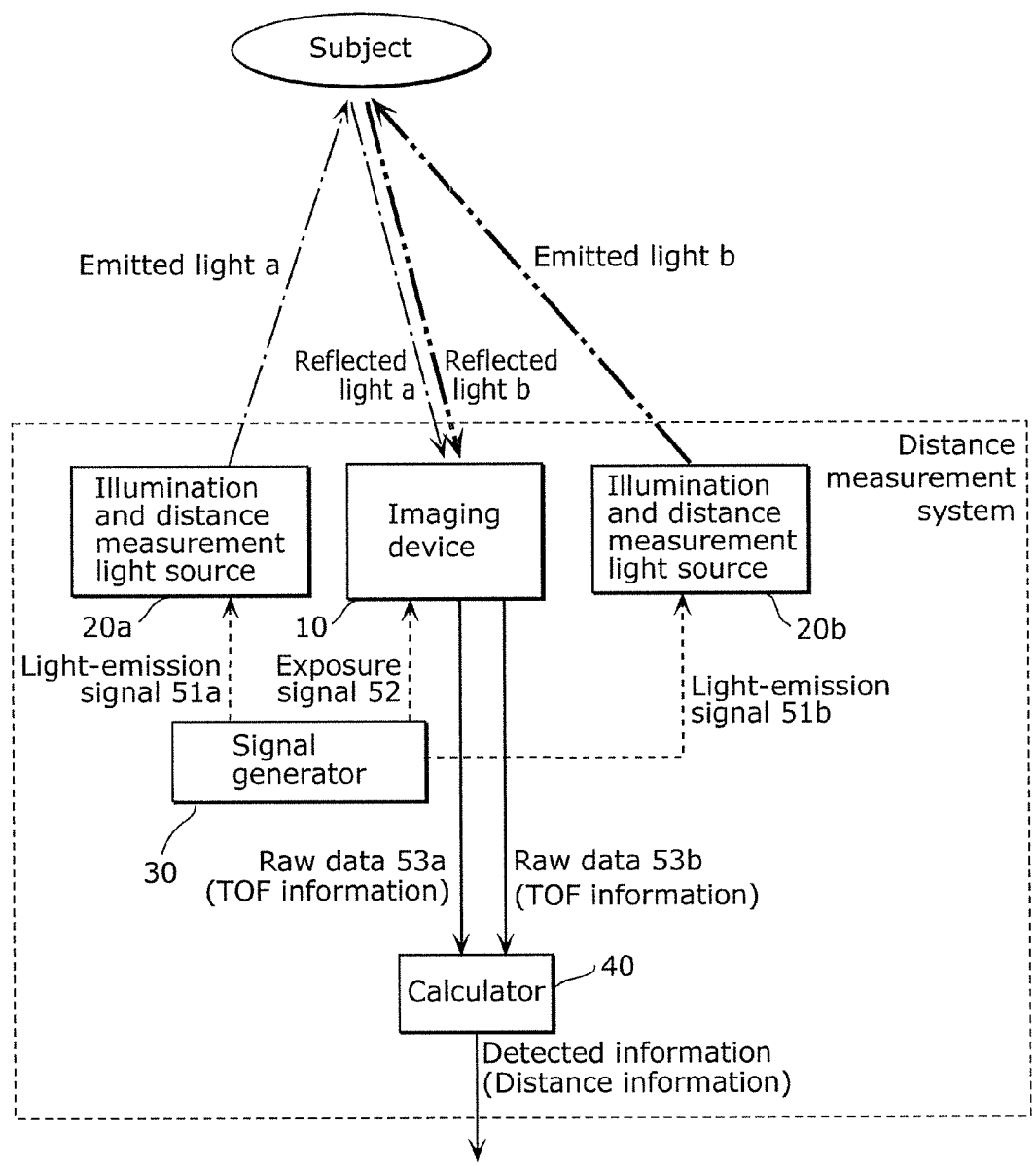
FIG. 11 is a functional block diagram illustrating a schematic structure of a distance measurement system according to Embodiment 2.

The distance measurement system according to Embodiment 2 further includes a second illumination and distance measurement light source, and the calculator 40 performs the distance measurement using phase difference information indicating a phase difference between the first illumination and distance measurement light source and the second illumination and distance measurement light source. FIG. 11 is a functional block diagram illustrating a schematic structure of another distance measurement system according to Embodiment 2. FIG. 12 is a schematic perspective view illustrating, as an example of Embodiment 2, the case of installing the distance measurement system 1 in an automobile, which is transport equipment. FIG. 12 illustrates the details of the illumination and distance measurement light source 20 and the imaging device 10 in particular. The first and second illumination and distance measurement light sources are denoted as illumination and distance measurement light sources 20a and 20b, respectively.

In FIG. 11 and FIG. 12, a plurality of illumination and distance measurement light sources 20a and 20b are mounted at a certain distance from each other like the headlights (headlight assemblies) of an automobile, and each of the illumination and distance measurement light sources 20a and 20b doubles as an illumination light source and a distance measurement light source which is used for detecting a physical quantity such as distance.

With this, the imaging device 10 receives a plurality of reflected rays of light emitted from different positions, and outputs a plurality of pieces of raw data 53a and 53b to the calculator 40. The calculator 40 performs distance calculation based on the TOF using the left and right headlights (headlight assemblies). The calculator 40 also performs correction of TOF data using, as correction information, the plurality of pieces of raw data 53a and 53b, that is, second distance information generated using the reflected rays of light having a phase difference therebetween. This enables the distance measurement system according to the present embodiment to perform the detection at higher precision.

Furthermore, light sources which emit light having different wavelengths for distance measurement are used for the illumination and distance measurement light sources 20a and 20b, and thus it is possible to stereoscopically perceive the shape of an object based on image data and distance data obtained using the illumination and distance measurement light sources 20a and 20b.

That is to say, in the present embodiment, it is more preferable to apply the distance measurement system particularly to an automobile headlight assembly serving as the plurality of illumination and distance measurement light sources. This enables calculation of relative positions of the subject and the image sensor based on the difference between a path of emitted light a and reflected light a and a path of emitted light b and reflected light b. This means that it is possible to perform the distance measurement at higher precision without having to make a significant modification to the structure of existing lighting equipment.

Note that, in FIG. 12, the headlights (headlight assemblies) are used as the plurality of illumination light sources mounted at a certain distance from each other; however, it is also possible to use other light sources (e.g., fog lamps 100a and 100b).

Also, although the imaging device 10 in FIG. 12 is mounted at the inner top part of the windshield (in the vicinity of the rearview mirror), the present disclosure is not limited to this. It is also possible to mount the imaging device 10 in the front grille or in the front bumper, for example.

Figure 13A:
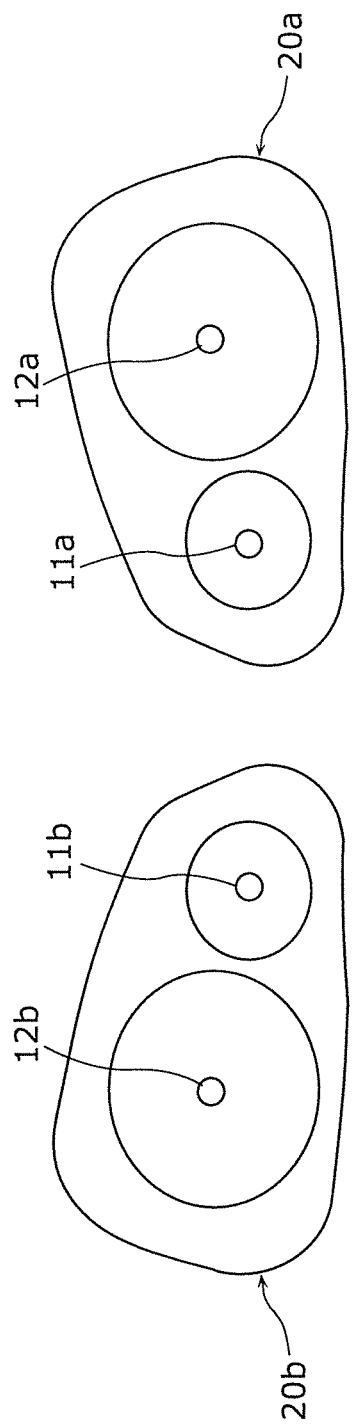
FIG. 13A illustrates the details of a first illumination and distance measurement light source and a second illumination and distance measurement light source of a distance measurement system according to Embodiment 2.

We now continue with the detailed description of the present embodiment. FIG. 13A illustrates the distance measurement system 1 for an automobile to which Embodiment 2 is applied for use in automobiles. FIG. 13A illustrates the details of the first and second illumination and distance measurement light sources in particular. One of the first illumination and distance measurement light source and the second illumination and distance measurement light source is either one of (a) left and right high beam light sources and (b) left and right low beam light sources, and the other of the first illumination and distance measurement light source and the second illumination and distance measurement light source is the other one of (a) and (b). Here, the left and right high beam light sources and the left and right low beam light sources are provided in the vehicle.

In other words, the distance measurement system 1 according to the present embodiment is applied to the headlights (headlight assemblies) of an automobile, and high beam light sources 11a and 11b and low beam light sources 12a and 12b are used as the first and second illumination and distance measurement light sources. More specifically, the first illumination and distance measurement light source includes at least one of the high beam light source 11a and the low beam light source 12a, and the second illumination and distance measurement light source includes at least one of the high beam light source 11b and the low beam light source 12b. This makes it possible to perform the distance measurement at high precision while sufficiently lighting up the darkness at night.

FIG. 13B illustrates exemplary pairs of the high beam light sources 11a and 11b and the low beam light sources 12a and 12b as the first and second illumination and distance measurement light sources in the TOF mode (first distance measurement mode) and the illumination mode.

The pair A in FIG. 13B indicates that the low beam light sources 12a and 12b are used both in the TOF mode (first distance measurement mode) and the illumination mode. In other words, the distance measurement for which the operations illustrated in FIG. 8 to FIG. 10 and the phase difference information are used is performed with the pair A.

Similarly, the pair B indicates that the high beam light sources 11a and 11b are used both in the TOF mode (first distance measurement mode) and the illumination mode. The pair C indicates that the low beam light sources 12a and 12b are used in the TOF mode (first distance measurement mode) and the high beam light sources 11a and 11b are used in the illumination mode. The pair D indicates that the high beam light sources 11a and 11b are used in the TOF mode (first distance measurement mode) and the low beam light sources 12a and 12b are used in the illumination mode.

In the case of the pair D, by using infrared light separately for the high beam and synchronizing with the low beam light sources 12a and 12b, distance measurement can be performed with no glare to the subject, pedestrians, etc., from the infrared light high beam or the illumination with the low beam for lighting up a dark place. The synchronization here means synchronization between turning off of one of the first and second illumination and distance measurement light sources and turning on of the other of the first and second illumination and distance measurement light sources.

Note that in the present embodiment, it is also possible to use the respective operations in the TOF mode, the illumination mode, and the background light amount measurement mode described above with reference to FIG. 8, FIG. 9A, and FIG. 10. This enables the distance measurement at higher precision.

Note that although FIG. 12 and FIG. 13A illustrated the example of installation of the distance measurement system in an automobile, the present disclosure is not limited to this example. It is also possible to install the distance measurement system in a variety of equipment, such as other types of transport equipment (e.g., bicycle, motorcycle, railroad car, airplane, spacecraft), infrastructure equipment, heavy equipment (e.g., excavator, bulldozer), and housing equipment.

Embodiment 3

In Embodiment 3, a distance measurement system having an image distance measurement mode will be described. The image distance measurement mode is a mode in which second distance measurement is performed through comparison between a current frame and a previous frame using an image signal from the imaging device.

Hereinafter, the structure and operation of the distance measurement system 1 according to Embodiment 3 will be described with reference to the drawings, centering on the differences from the description given in the above embodiments.

Figure 14A:
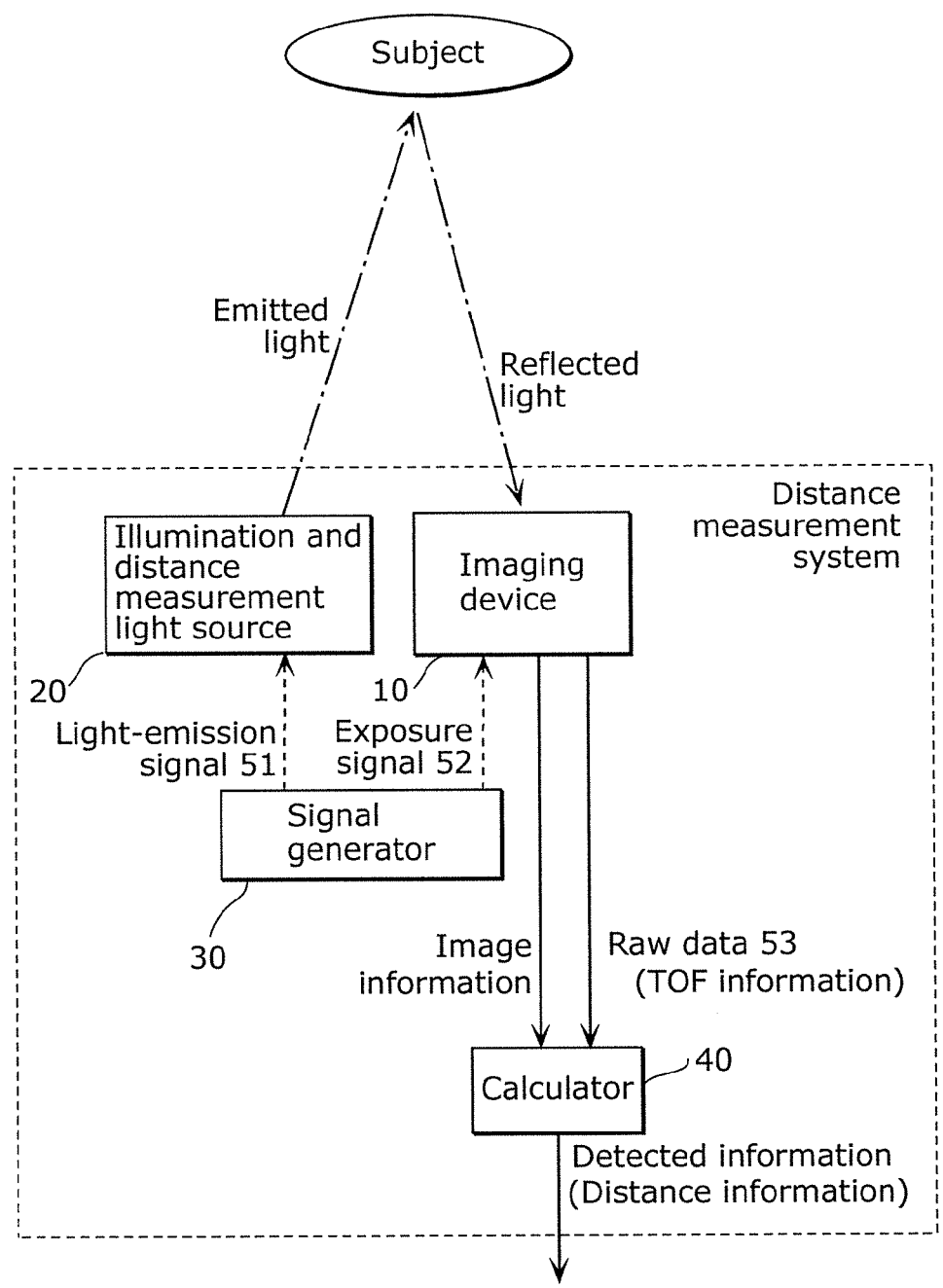
FIG. 14A is a functional block diagram illustrating a schematic structure of a distance measurement system including a single illumination and distance measurement light source according to Embodiment 3.
Figure 14B:
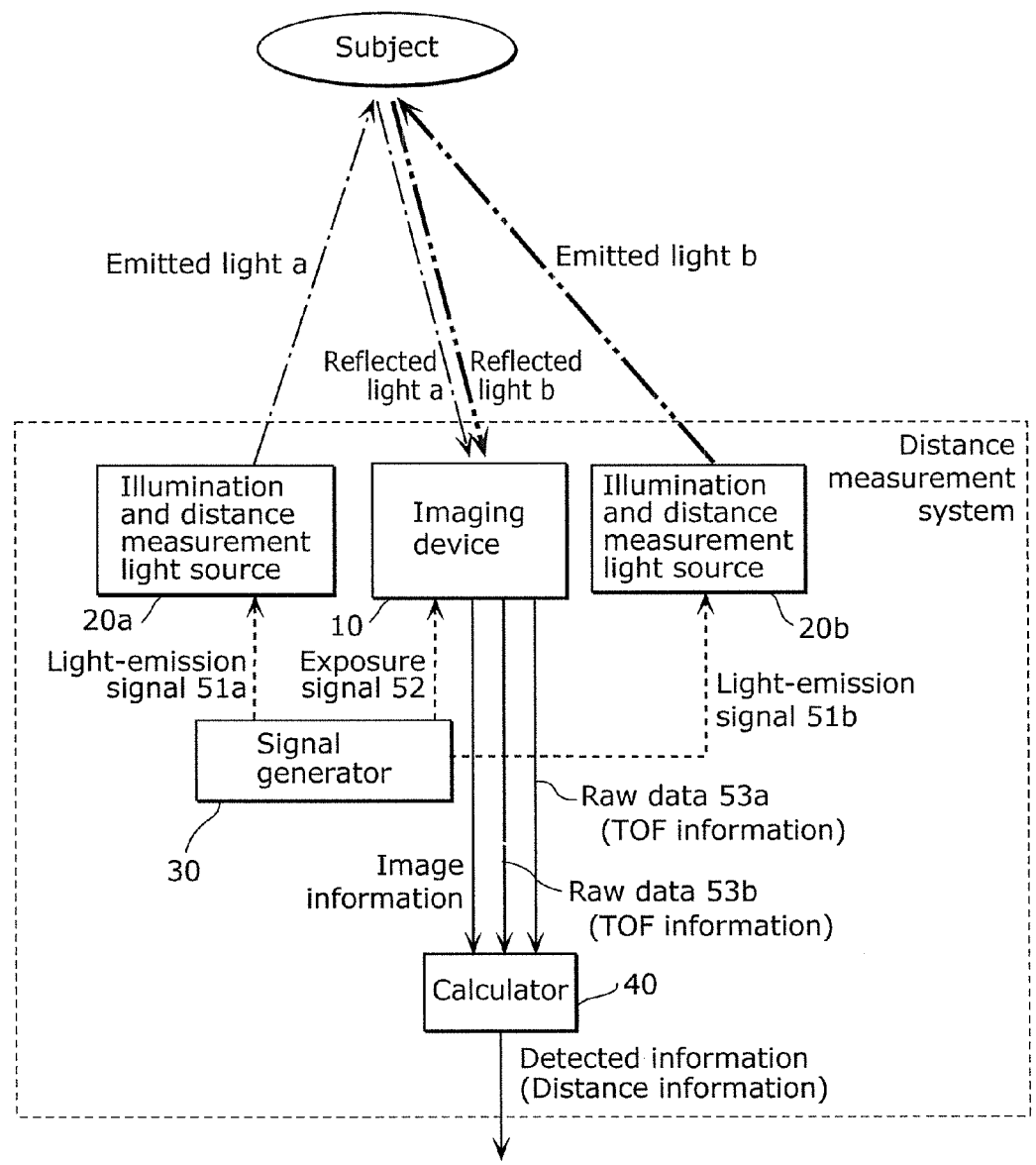
FIG. 14B is a functional block diagram illustrating a schematic structure of a distance measurement system including a first illumination and distance measurement light source and a second illumination and distance measurement light source according to Embodiment 3.

FIG. 14A and FIG. 14B are functional block diagrams each illustrating a schematic structure of the distance measurement system 1 according to Embodiment 3. FIG. 14A illustrates the structure including a single illumination and distance measurement light source 20 as in Embodiment 1 described with reference to FIG. 1, whereas FIG. 14B illustrates the structure including first and second illumination and distance measurement light sources as in Embodiment 2 described with reference to FIG. 11.

In FIG. 14A and FIG. 14B, the distance measurement system 1 includes the imaging device 10, the illumination and distance measurement light source 20 (20a and 20b), the signal generator 30, and the calculator 40.

The illumination and distance measurement light source 20 (20a and 20b) includes a driving circuit, a capacitor, and a light-emitting device, and emits light by supplying the light-emitting diode with charge held in the capacitor. As the light-emitting device, a laser diode, a light-emitting diode (LED), or the like may be used.

The signal generator 30 generates a light-emission signal 51 (51a and 51b) that instructs light emission and an exposure signal 52 (52a and 52b) that instructs exposure of light reflected by a subject. The illumination and distance measurement light source 20 (20a and 20b) emits light to the subject with the purpose of distance measurement, according to the timing of receiving the light-emission signal 51 generated by the signal generator 30.

The illumination and distance measurement light source 20 (20a and 20b) further emits light for lighting up a dark place without the purpose of distance measurement, according to the timing of receiving the light-emission signal 51 (51a and 51b) generated by the signal generator 30.

The imaging device 10 includes a camera lens, a solid-state imaging sensor (image sensor), and a circuit which generates and outputs raw data 53 (53a and 53b), such as an A/D converter. The imaging device 10 exposes a region including a target object (subject) to light for a plurality of times at the timing indicated by the exposure signal 52 (52a and 52b) generated by the signal generator 30, and obtains the raw data 53 (53a and 53b) (TOF information) corresponding to the total amount of the light exposure performed for the plurality of times.

Furthermore, the imaging device 10 captures an image and outputs image information to the calculator 40.

The calculator 40 performs an operation using the raw data 53 (53a and 53b) and the image information received from the imaging device 10, and outputs distance information (detected information) indicating the distance to the subject.

First, the distance measurement is performed in the TOF mode, which is the same as in the embodiments described above.

In addition, image capturing is performed in the present embodiment, and a distance is measured using image data. An example of the method for this type of distance measurement is to capture successive images using the imaging device 10 and compare a current frame (image) and a previous frame (image) to calculate a distance, based on an operation (image distance measurement mode).

By using both the TOF data and the image information as the distance information in the ways described below, it is possible to enhance the precision of the distance measurement.

The first way of use is to select a measurement mode (distance information) depending on whether it is day-time or night-time. For example, when it is usual not to turn on the illumination light source, e.g., day-time, the distance measurement is performed in the image distance measurement mode with the illumination and distance measurement light source 20 (20a and 20b) turned off in the present embodiment. On the other hand, when it is usual to turn on the illumination light source, e.g., night-time, the distance measurement is performed in the TOF mode with the illumination and distance measurement light source 20 (20a and 20b) turned on (pulse lighting drive) in the present embodiment. This enables accurate distance measurement regardless of whether it is day-time or night-time and without turning on the illumination and distance measurement light source 20 at day-time.

The second way of use is to complement the distance information obtained in the TOF mode with the distance information obtained in the image distance measurement mode. This further enhances the precision of the distance measurement.

The third way of use is to select a measurement mode (distance information) depending on a factor such as the weather or an environmental condition. For example, the TOF mode is selected when there is strong sunlight, e.g., in the later afternoon, or when it is raining (that is, when image recognition is difficult), whereas the image distance measurement mode is selected in the other environmental conditions. This enables the distance measurement at high precision regardless of the weather and circumstance.

The fourth way of use is to select a measurement mode (distance information) depending on the distance to the subject. Specifically, the TOF mode and the image distance measurement mode are selected when the distance to the subject is as small as less than 10 m, whereas the TOF mode is mainly selected when the distance to the subject is as large as 10 m or greater, for example. This enables the distance measurement at high precision regardless of the distance to the subject.

The fifth way of use is to select a measurement mode (distance information) depending on the movement velocity of the subject or the movement velocity of the transport equipment (e.g., automobile) in which the distance measurement system 1 is installed. For example, the TOF mode and the image distance measurement mode are selected when the velocity of the transport equipment is less than 30 km/h, one of the TOF mode and the image distance measurement mode is selected on a frame-by-frame basis when the velocity of the transport equipment is in a range from 30 km/h to 100 km/h, and the TOF mode is selected when the velocity of the transport equipment is 100 km/h or greater. This enables the distance measurement at high precision regardless of the distance to the subject.

Note that in the present embodiment, it is also possible to use the respective operations in the TOF mode, the illumination mode, and the background light amount measurement mode described above with reference to FIG. 8, FIG. 9A, and FIG. 10. This enables the distance measurement at higher precision.

The installation of the distance measurement system 1 according to the present embodiment in heavy equipment or each of heavy equipment and a structure at a worksite as illustrated in FIG. 2 and FIG. 3 makes automated operations possible despite the small size and light weight of the distance measurement system 1. For example, it is possible to automatically dig until an obstacle is reached, and automatically stop the operation when it is recognized from a captured image that it is not possible to dig the obstacle (e.g., the object is hard or may explode).

It is also possible to install the distance measurement system 1 according to the present embodiment in a variety of equipment, such transport equipment (e.g., bicycle, motorcycle, railroad car, airplane, spacecraft), infrastructure equipment, heavy equipment (e.g., excavator, bulldozer), and housing equipment.

Variation of Embodiment 3

Hereinafter, the structure and operation of the distance measurement system 1 according to the present variation will be described in detail with reference to the drawings, centering on the differences from the description given in the above embodiments.

Figure 15A:
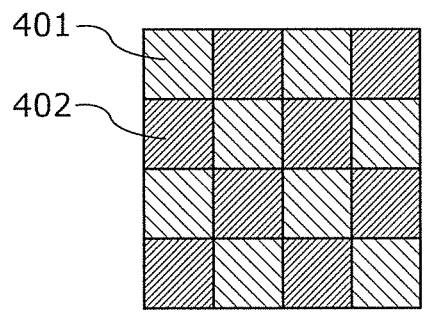
FIG. 15A illustrates a first example of how microlenses of a solid-state imaging sensor according to Embodiment 3 are arranged.
Figure 15B:
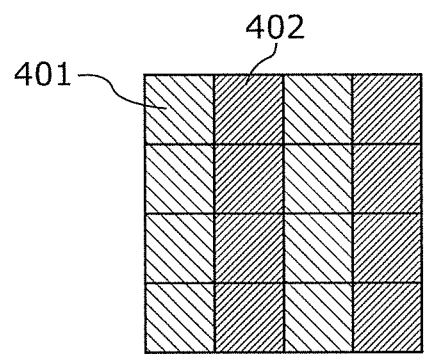
FIG. 15B illustrates a second example of how microlenses of a solid-state imaging sensor according to Embodiment 3 are arranged.
Figure 15C:
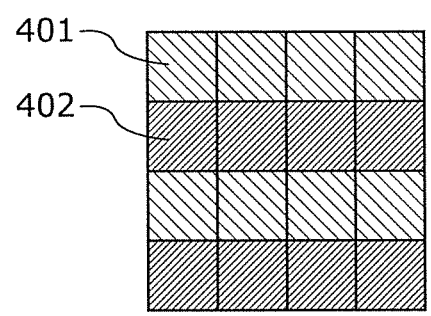
FIG. 15C illustrates a third example of how microlenses of a solid-state imaging sensor according to Embodiment 3 are arranged.
Figure 15D:
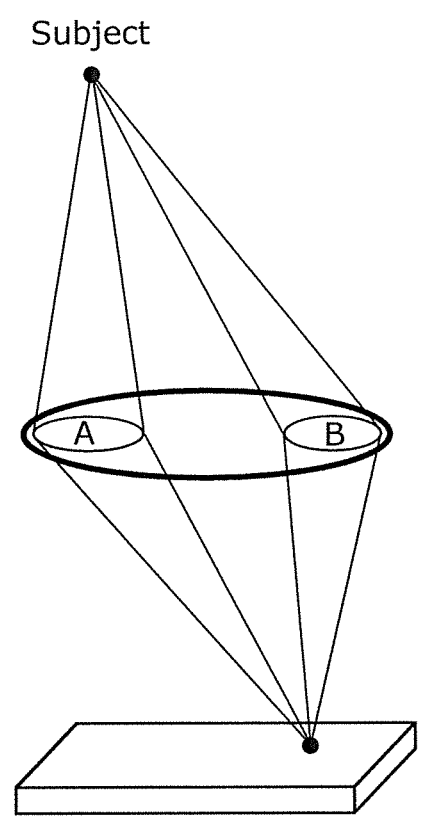
FIG. 15D illustrates an optical path between a solid-state imaging sensor according to Embodiment 3 and each of a lens and a subject.

First, FIG. 15A to FIG. 15C illustrate first to third examples of how unit cells (microlenses) are arranged. FIG. 15D illustrates an optical path between a solid-state imaging sensor and each of a lens and a subject. Regions A and B are regions in the lens.

In FIG. 15A to FIG. 15C, first unit cells 401 are unit cells that receive light from the region A in FIG. 15D, whereas second unit cells 402 are unit cells that receive light from the region B in FIG. 15D.

In FIG. 15A, a plurality of first unit cells 401 and a plurality of second unit cells 402 are arranged in a checked pattern, that is, the first unit cells 401 and the second unit cells 402 alternate in the column direction (vertical direction) and the row direction (horizontal direction). In FIG. 15B, the columns of the first unit cells 401 and the columns of the second unit cells 402 alternate in the row direction. In FIG. 15C, the rows of the first unit cells 401 and the rows of the second unit cells 402 alternate in the column direction. Note that although these three patterns are illustrated as examples of how the unit cells are arranged, the first unit cells 401 and the second unit cells 402 may be arranged in such a manner that the unit cells are arranged on a block-by-block basis, where each block consists of several cells. With such arrangement, two types of light are locally received at the same time.

Figure 16:
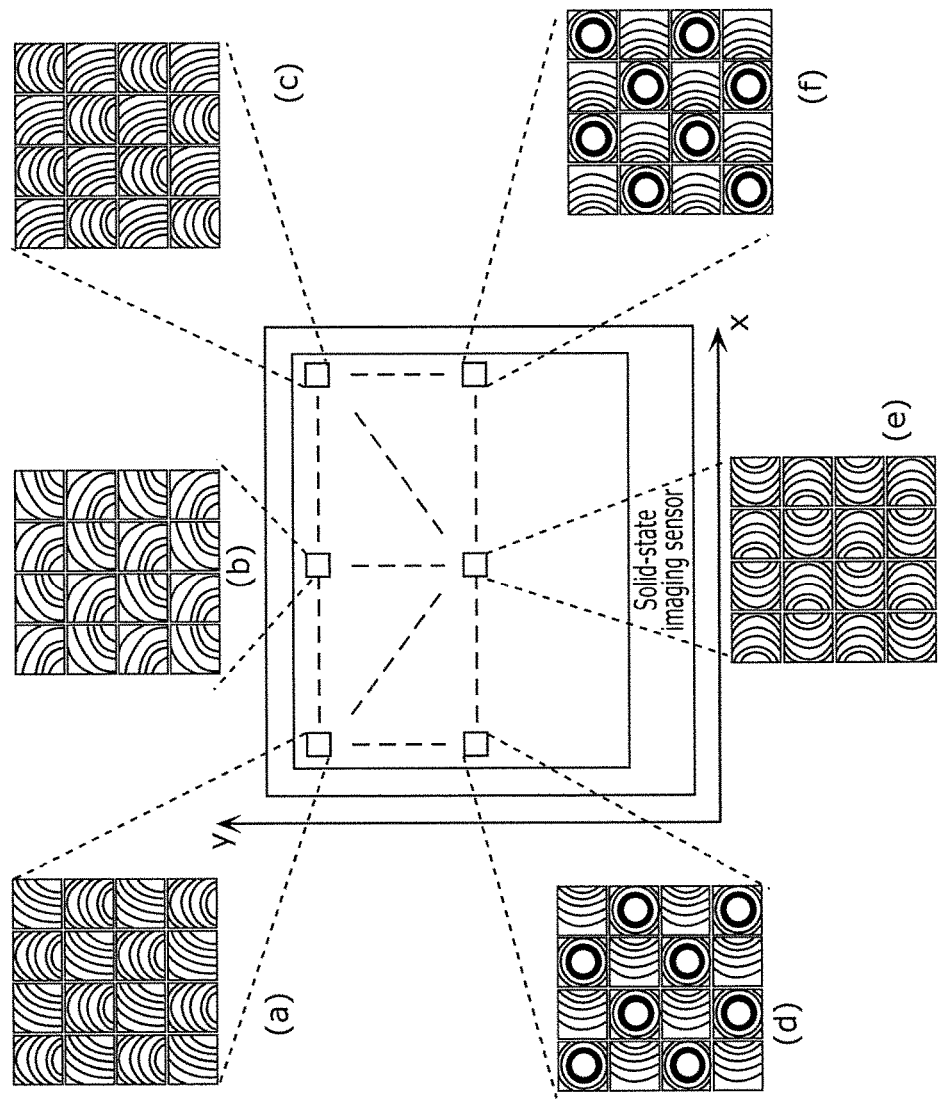
FIG. 16 is a planar structure diagram illustrating, for each group of unit cells, an arrangement and structure of microlenses of a solid-state imaging sensor according to an embodiment.

FIG. 16 is a planar structure diagram illustrating the arrangement and structure of microlenses for each group of unit cells.

As illustrated in FIG. 4 described earlier, the microlens 307 generally has a curved surface, and concentrates light by bending the light using the difference in refractive index between the microlens and a substance in contact with the microlens (e.g., gas, solid).

In contrast, each of the microlenses illustrated in FIG. 16 includes a plurality of light-transmitting films having a concentric structure with the central axis extending in the direction perpendicular to the light-receiving surface of the microlens. In a top view, the light-transmitting films are separated by a linewidth comparable to or shorter than the wavelength of light entering the microlens. Each microlens has an effective refractive index distribution which is controlled according to the combination of the plurality of light-transmitting films. That is to say, with the structure in which materials (light-transmitting films) having different refractive indices are consecutively disposed from the central axis described above, the microlens has an effective refractive index distribution as a lens.

To obtain such a microlens, the microlens is formed from an inorganic material, for example. Such a lens is known as a digital microlens. By mounting a microlens having a top-surface pattern as illustrated in FIG. 16 above each unit cell, each unit cell can locally have a different focusing characteristic with respect to the incident angle. In other words, decentering the above-described central axis from the center of the unit cell makes it possible to set an incident angle that maximizes the amount of light (light-receiving sensitivity).

Thus, since a first unit cell and a second unit cell having different incident angles maximizing the amount of light are arranged side by side, it is possible to receive incident light in two directions at the same time and to form a stereoscopic image using a monocular image sensor without requiring a stereo camera.

This structure enables rendering of a stereoscopic image without requiring a stereo camera (compound-eye camera), and the distance measurement can be performed at even higher precision in the image distance measurement mode in which the stereoscopic image data is used.

Figure 18A:
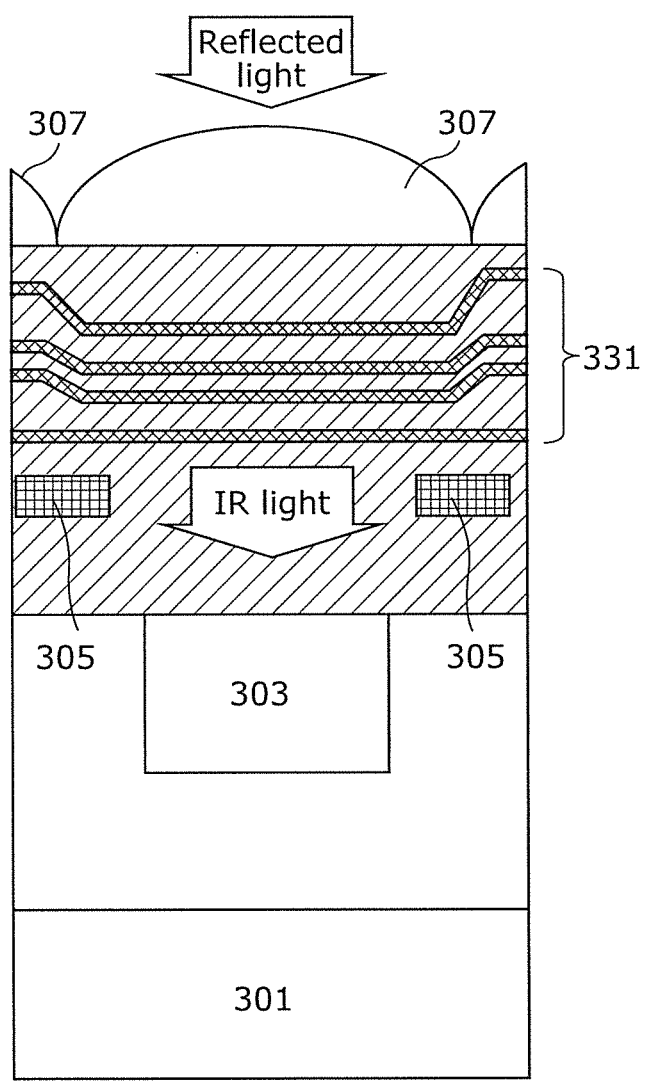
FIG. 18A is a cross-sectional structure diagram of a pixel in an image sensor in which a distance measurement system according to an embodiment is installed, illustrating the details of an IR transmission filter (photonic filter) in particular.
Figure 18B:
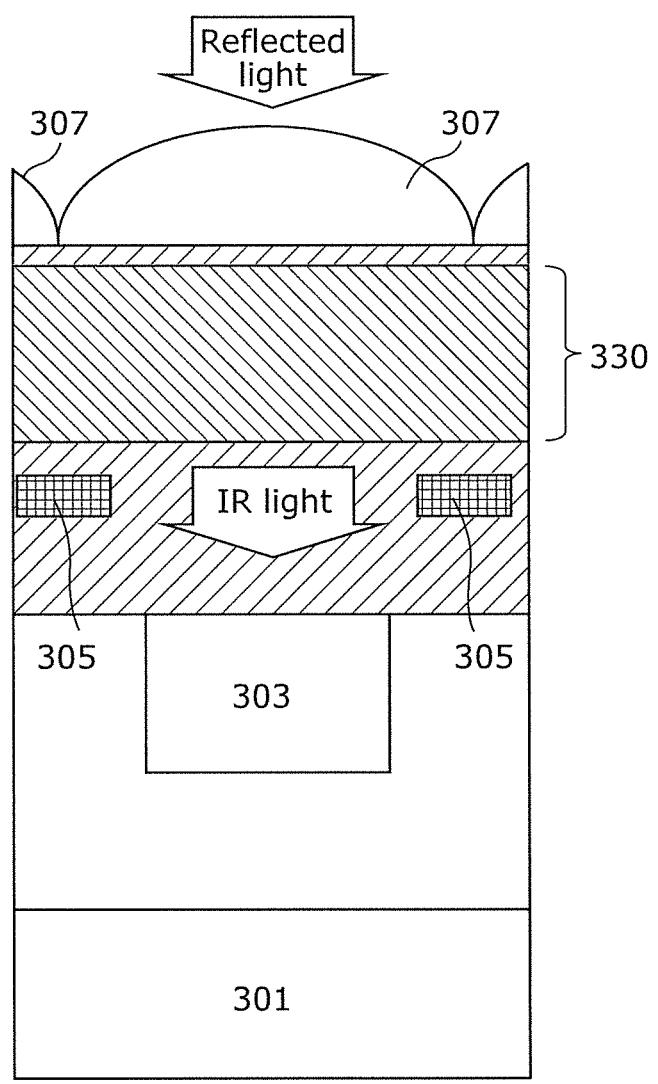
FIG. 18B is a cross-sectional structure diagram of a pixel in an image sensor in which a distance measurement system according to an embodiment is installed, illustrating the details of an IR transmission filter (formed from organic materials) in particular.

Note that it is also possible to use the above-described digital microlens as the microlens 307 illustrated in FIG. 4, FIG. 18A, and FIG. 18B.

Embodiment 4

Hereinafter, the structure and operation of the distance measurement system 1 according to Embodiment 4 will be described in detail with reference to the drawings.

Figure 17:
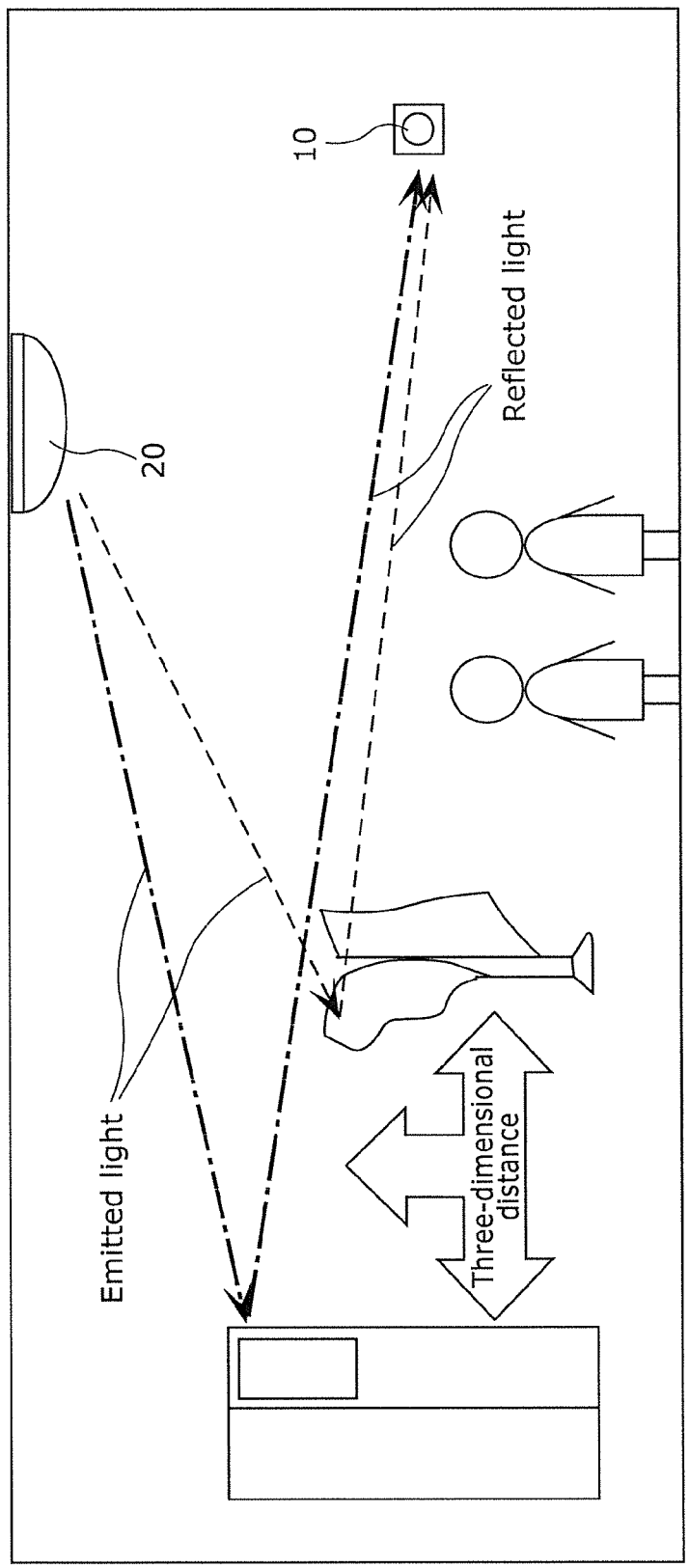
FIG. 17 illustrates an example where a distance measurement system according to Embodiment 4 is installed in housing equipment.

FIG. 17 illustrates an example of installation of the distance measurement system 1 described in Embodiment 1 or Embodiment 2 in housing equipment (living space). FIG. 17 illustrates the illumination and distance measurement light source 20 and the imaging device 10 in particular.

Installation of the distance measurement system 1 according to the present embodiment in housing equipment makes it possible to automatically obtain data such as information on the dimensions of a space and information on a furniture layout. When purchasing furniture or the like by mail order, automatic simulation is possible using such data to find out whether the size of the furniture is appropriate, for example.

Variation 1 of Embodiments

Hereinafter, the structure and operation of the distance measurement system 1 according to the present variation will be described in detail with reference to the drawings, centering on the differences from the description given in the above embodiments.

Each of FIG. 18A and FIG. 18B is a cross-sectional structure diagram of a pixel in an image sensor in which the distance measurement system 1 according to Embodiments 1 to 3 is installed. FIG. 18A and FIG. 18B each illustrate the details of an infrared (IR) transmission filter in particular.

In FIG. 18A, the IR transmission filter is a photonic color filter 331 formed by periodically stacking layers having different refractive indices, for example. With the IR transmission filter, at least one of the stacked layers has a thickness determined according to the color of light to pass through, for example, so that light with different wavelengths can be selectively transmitted according to the color of light that unit cell 21 is to detect.

The IR transmission filter is formed by stacking inorganic materials such as $SiO_2$ and $TiO_2$. The IR transmission filter is manufactured by, for example, sputtering or a vacuum film forming method such as vacuum deposition. Use of inorganic materials makes it possible to form an IR transmission filter having unit cells 21 with different wavelength characteristics.

Here, as described with reference to FIG. 4, the image sensor can receive IR light and generate signal charge even without the IR transmission filter, as a result of optimization of the structure (e.g., optimization of impurity profile) of the light receiver (e.g., photodiode). However, providing the image sensor with the IR transmission filter makes it possible to select the wavelength of light to be received.

Moreover, although it is possible to achieve the advantageous effect of the present disclosure by forming an IR transmission filter 330 from typical organic materials as illustrated in FIG. 18B, forming the IR transmission filter from inorganic materials as described above makes it possible to narrow the range of wavelengths of light to be selected.

This enables the distance measurement at higher precision.

Variation 2 of Embodiments

FIG. 19 is a planar structure diagram of a solid-state imaging sensor according to the present variation, illustrating that each pixel includes an R+IR filter, a G+IR filter, a B+IR filter, or an IR filter.

In the case where the background light contains an infrared component, each pixel having the R+IR, the G+IR filter, or the B+IR filter receives, through the filter transmission, infrared light that is a part of the infrared component included in the background light. That is to say, each pixel having the R+IR filter receives the R component and a part of the infrared component, each pixel having the G+IR filter receives the G component and a part of the infrared component, and each pixel having the B+IR filter receives the B component and a part of the infrared component. Furthermore, each pixel having the IR transmission filter receives a part of the infrared component only. These pixels then perform photoelectric conversion on the respective components received, and accumulate charge obtained from the photoelectric conversion during a visible exposure time.

Here, the distance measurement system 1 according to Embodiment 2 performs the distance measurement in the TOF mode using light which has passed through the IR transmission filter, whereas the distance measurement system 1 according to Embodiment 3 captures an image using light which has passed through the R+IR, G+IR, and B+IR transmission filters, and performs distance measurement using image data obtained from the image capturing. An example of the method for such distance measurement using image data is to capture successive images using the imaging device 10, and calculate the distance through comparison between a current frame (image) and a previous frame (image). This way, the distance measurement can be performed at higher precision.

Figure 20:
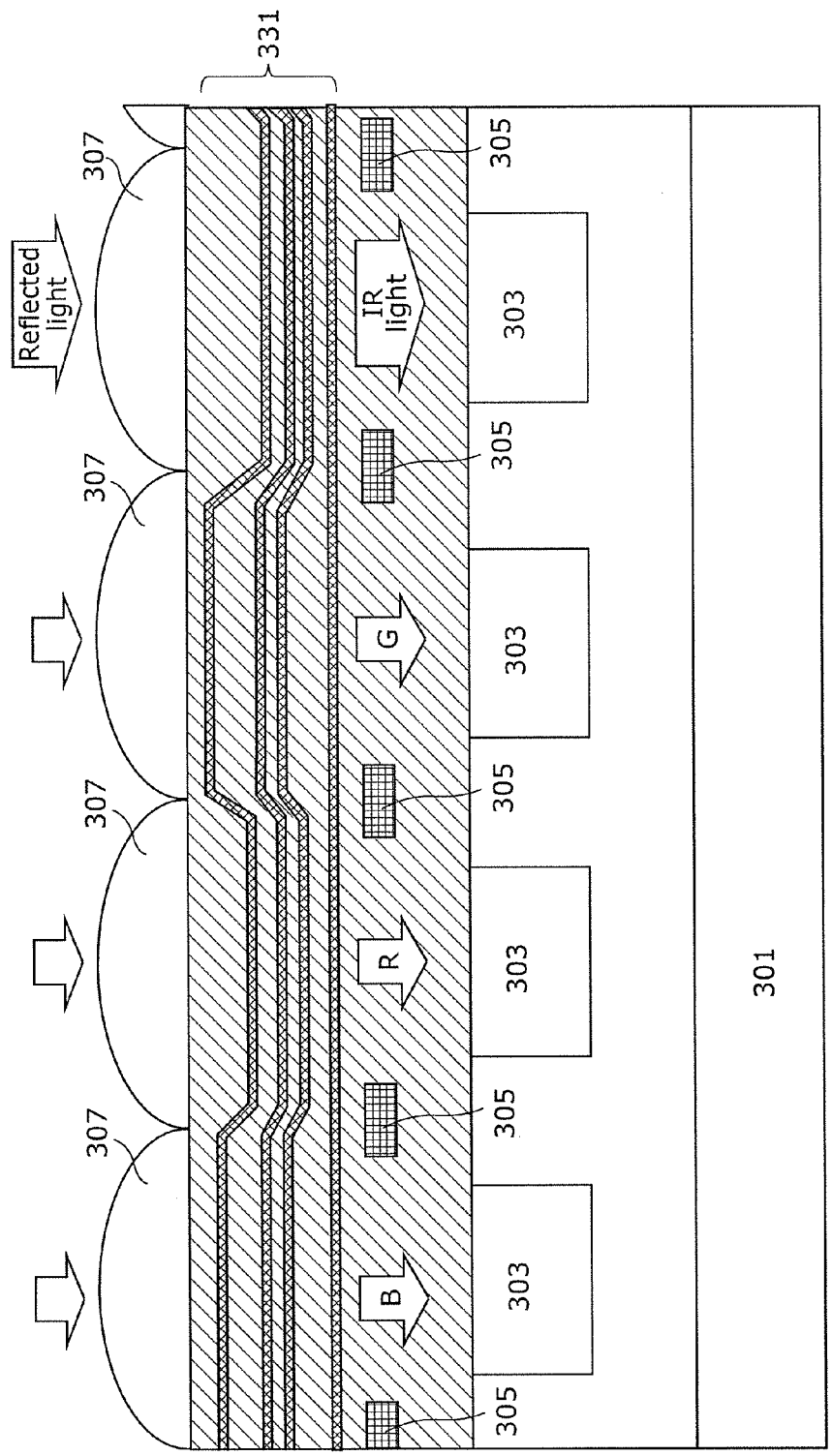
FIG. 20 is a cross-sectional structure diagram of a solid-state imaging sensor according to an embodiment.
Figure 21:
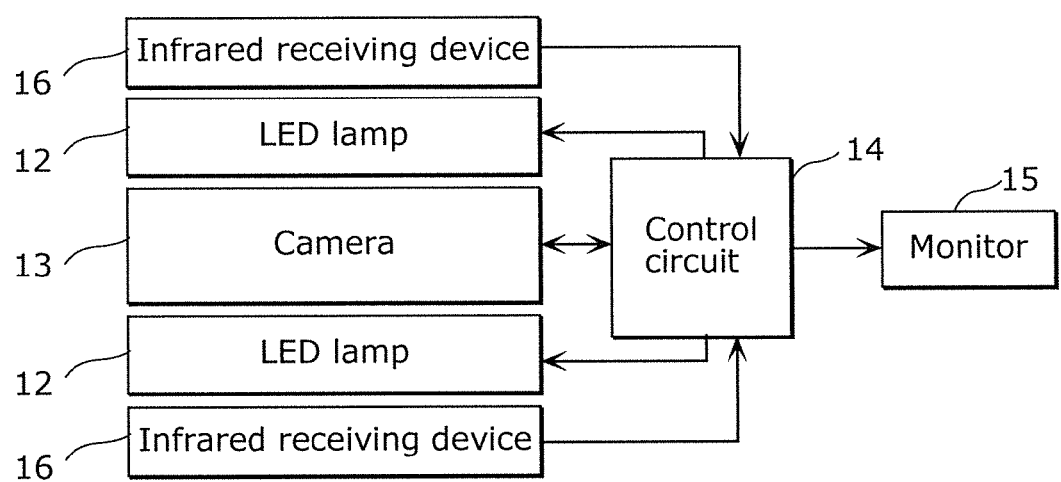
FIG. 21 is a functional block diagram of a conventional detection system.

Note that in the present variation, as illustrated in FIG. 20, it is also possible to form each of the R+IR filter, G+IR filter, B+IR filter, and IR filter by stacking inorganic materials as illustrated in FIG. 18A.

Moreover, in the present variation, it is also possible to form each of the R+IR filter, G+IR filter, B+IR filter, and IR filter using organic materials as illustrated in FIG. 18B.

Furthermore, in the present variation, it is also possible to form some of the R+IR filter, G+IR filter, B+IR filter, and IR filter as filters formed from inorganic materials and some of them as filters formed from organic materials.

In addition, in the present variation, it is also possible to form each of the R+IR filter, G+IR filter, B+IR filter, and IR filter by combining a filter formed from inorganic materials and a filter formed from organic materials (e.g., by overlapping the filter formed from inorganic materials and the filter formed from organic materials in a direction perpendicular to the semiconductor substrate).

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The distance measurement system according to the present disclosure enables three-dimensional measurement on a measurement target at high precision without being dependent on the surrounding environment. The distance measurement system is thus useful in three-dimensional measurement on a person and a building, for example.

The invention claimed is:

1. A distance measurement system to be used in transport equipment, the distance measurement system comprising:
   a signal generator that generates light emission pulse signals, of a plurality of types, that instruct light emission and an exposure signal that instructs exposure of reflected light;
   a headlight assembly that receives the light emission pulse signals and, according to the light emission pulse signals received, emit pulsed light for illumination without a purpose of distance measurement and emit pulsed light with the purpose of distance measurement using the reflected light;
   an imaging device that includes a solid-state imaging sensor which receives the exposure signal, performs the exposure according to the exposure signal received, and obtains an amount of light exposure of the reflected light to perform the distance measurement; and
   a calculator that calculates distance information using the amount of light exposure and output the distance information,
   wherein the headlight assembly includes a first light source and a second light source, and
   the signal generator generates, as the light emission pulse signals of the plurality of types, (i) a first light-emission pulse signal that instructs light emission for performing a distance measurement mode in which distance measurement is performed using the first light source, and (ii) a second light-emission pulse signal for performing an illumination mode in which illumination without the purpose of the distance measurement is performed using the second light source.

2. The distance measurement system according to claim 1, wherein the illumination in the illumination mode and the distance measurement in the distance measurement mode are performed by synchronizing turning ON of the first light-emission pulse signal and turning OFF of the second light-emission pulse signal or by synchronizing turning OFF of the first light-emission pulse signal and turning ON of the second light-emission pulse signal.

3. The distance measurement system according to claim 1, wherein a time duration in which the first light-emission pulse signal is ON is shorter than a time duration in which the second light-emission pulse signal is ON.

4. The distance measurement system according to claim 1, wherein the second light-emission pulse signal is turned ON after the time duration in which the first light-emission pulse signal is ON is repeated a plurality of times.

5. The distance measurement system according to claim 1, wherein a sum of the number of times the first light-emission pulse signal is ON and the number of times the second light-emission pulse signal is ON is at least 120 times per second.

6. The distance measurement system according to claim 1, wherein the first light-emission pulse signal has an amplitude larger than an amplitude of the second light-emission pulse signal.

7. The distance measurement system according to claim 1, wherein a time duration in which the light emitted by the headlight assembly in the distance measurement mode is ON is shorter than a time duration in which the light emitted by the headlight assembly in the illumination mode is ON.

8. The distance measurement system according to claim 1, wherein the light emitted by the headlight assembly in the distance measurement mode has an amplitude larger than an amplitude of the light emitted by the headlight assembly in the illumination mode.

9. The distance measurement system according to claim 1, wherein the distance measurement mode and the illumination mode are switched at least 120 times per second.

10. The distance measurement system according to claim 1, wherein the first light source is a high beam light source that emits infrared light, and
    the second light source is a low beam light source.

11. The distance measurement system according to claim 1, wherein the distance measurement mode is a time of flight (TOF) mode.

12. The distance measurement system according to claim 1,
wherein the headlight assembly and the imaging device are mounted at a certain distance from each other.

13. The distance measurement system according to claim 1,
wherein the distance measurement system has a mode in which the imaging device operates and the calculator measures an amount of background light with the headlight assembly turned off, and
the calculator performs correction by subtracting the amount of background light from the amount of light exposure in the distance measurement mode.

14. The distance measurement system according to claim 1,
wherein the headlight assembly includes a light-emitting diode (LED) or a laser diode.

15. The distance measurement system according to claim 1,
wherein the solid-state imaging sensor is a charge-coupled device (CCD) solid-state imaging sensor.

16. The distance measurement system according to claim 1,
wherein the solid-state imaging sensor includes
a plurality of pixels each including:
a light receiver that performs photoelectric conversion; and
an accumulator that accumulates signal charge read from the light receiver, and
the solid-state imaging sensor is a metal-oxide-semiconductor (MOS) solid-state imaging sensor that collectively reads the signal charge of the light receivers into the accumulators in the plurality of pixels.

17. The distance measurement system according to claim 1,
wherein the solid-state imaging sensor includes a plurality of pixels, and
each of the plurality of pixels includes any one of an infrared transmission filter, a first filter that transmits red light and infrared light, a second filter that transmits green light and infrared light, and a third filter that transmits blue light and infrared light.

18. A solid-state imaging sensor for use in a distance measurement system which is to be used in transport equipment, the distance measurement system including:
a signal generator that generates light emission pulse signals, of a plurality of types, that instruct light emission and an exposure signal that instructs exposure of reflected light;
a headlight assembly that receives the light emission pulse signals, and, according to the light emission pulse signals received, emits pulsed light for illumination without a purpose of distance measurement and emits pulsed light with the purpose of distance measurement using the reflected light;
an imaging device that includes the solid-state imaging sensor which receives the exposure signal, performs the exposure according to the exposure signal received, and obtains an amount of light exposure of the reflected light to perform the distance measurement; and
a calculator that calculates distance information using the amount of light exposure and outputs the distance information,
wherein the headlight assembly includes a first light source and a second light source,
the signal generator generates, as the light emission pulse signals of the plurality of types, (i) a first light-emission pulse signal that instructs light emission for performing a distance measurement mode in which distance measurement is performed using the first light source, and (ii) a second light-emission pulse signal for performing an illumination mode in which illumination without the purpose of the distance measurement is performed using the second light source, and
in the distance measurement mode, the solid-state imaging sensor captures an image using the reflected light that is infrared light emitted by the first light source and reflected by a subject.

* * * * *